United States Patent
Delin et al.

(10) Patent No.: US 7,925,469 B2
(45) Date of Patent: Apr. 12, 2011

(54) SENSOR WEB

(75) Inventors: Kevin A. Delin, Arcadia, CA (US); Shannon P. Jackson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/514,458

(22) Filed: Sep. 1, 2006

(65) Prior Publication Data

US 2007/0061098 A1 Mar. 15, 2007

Related U.S. Application Data

(62) Division of application No. 10/682,308, filed on Oct. 8, 2003, now Pat. No. 7,133,800.

(60) Provisional application No. 60/417,375, filed on Oct. 9, 2002, provisional application No. 60/426,317, filed on Nov. 14, 2002.

(51) Int. Cl.
G04G 7/00 (2006.01)
(52) U.S. Cl. ............ 702/178; 702/187; 375/356
(58) Field of Classification Search .......... 702/127, 702/176–179, 188, 187; 375/355, 356; 709/248; 370/464, 508, 512; 710/58, 61
See application file for complete search history.

(56) References Cited

U.S. PATENT DOCUMENTS

| | | | |
|---|---|---|---|
| 3,262,111 A * | 7/1966 | Graham | 342/88 |
| 5,335,186 A | 8/1994 | Tarrant | 702/127 |
| 5,430,663 A | 7/1995 | Judd et al. | 702/188 |
| 5,604,534 A * | 2/1997 | Hedges et al. | 348/144 |
| 5,687,391 A | 11/1997 | Judd et al. | 710/15 |
| 5,706,278 A | 1/1998 | Robillard et al. | 370/222 |
| 5,809,220 A | 9/1998 | Morrison et al. | 714/12 |
| 6,002,996 A | 12/1999 | Burks et al. | 702/188 |
| 6,452,504 B1 * | 9/2002 | Seal | 340/825.49 |
| 6,697,649 B1 * | 2/2004 | Bennett et al. | 455/574 |
| 6,801,878 B1 | 10/2004 | Hintz et al. | 702/188 |
| 7,012,980 B2 | 3/2006 | Franke et al. | 375/356 |
| 7,181,769 B1 * | 2/2007 | Keanini et al. | 726/23 |
| 2002/0012401 A1 | 1/2002 | Karolys et al. | 375/257 |
| 2002/0036989 A1 * | 3/2002 | Payton | 370/254 |
| 2003/0158706 A1 * | 8/2003 | Eidson | 702/187 |
| 2004/0128091 A1 | 7/2004 | Delin et al. | 702/75 |
| 2005/0020275 A1 * | 1/2005 | Agrawala et al. | 455/456.1 |

OTHER PUBLICATIONS

Edison, et al., "Synchronizing Measurement and Control Systems", *Sensors Magazine Online*, Nov. 2002 (7 pages).
"IEEE Standard for a Precision Clock Synchronization Protocol Networked Measurement and Control Systems", *IEEE Std 1588-2002*, p. 1 (2002).

* cited by examiner

*Primary Examiner* — Manuel L Barbee
(74) *Attorney, Agent, or Firm* — Law Office of Scott C. Harris, Inc.

(57) ABSTRACT

A Sensor Web formed of a number of different sensor pods. Each of the sensor pods include a clock which is synchronized with a master clock so that all of the sensor pods in the Web have a synchronized clock. The synchronization is carried out by first using a coarse synchronization which takes less power, and subsequently carrying out a fine synchronization to make a fine sync of all the pods on the Web. After the synchronization, the pods ping their neighbors to determine which pods are listening and responded, and then only listen during time slots corresponding to those pods which respond.

14 Claims, 17 Drawing Sheets

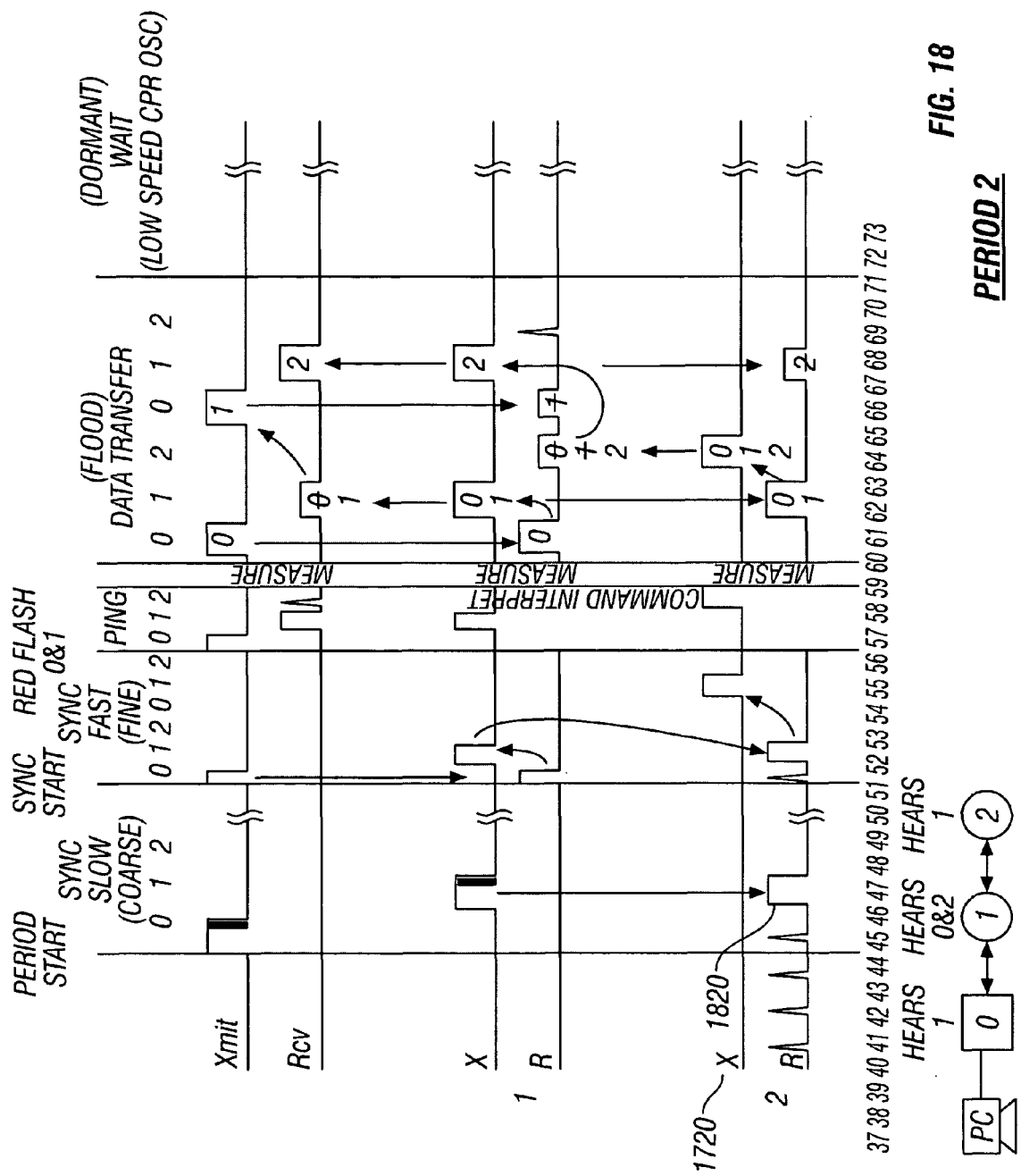

SENSOR WEB

CROSS-REFERENCE TO RELATED APPLICATIONS

This application is a divisional application of U.S. application Ser. No. 10/682,308, filed Oct. 8, 2003, now U.S. Pat. No. 7,133,800 which claims priority under 35 U.S.C. 119(e)(1) to U.S. provisional application Nos. 60/417,375, filed Oct. 9, 2002 and 60/426,317, filed Nov. 14, 2002.

STATEMENT REGARDING FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND AND SUMMARY

Sensing of parameters can be used to determine information about the environment for many purposes. A sensor can be used to detect conditions which require action. Rapid analysis of this information can enable better and more accurate environmental awareness.

Different ways of obtaining such information are known.

A single point sensor system provides monitoring of only a single location in space. Such devices can be used to detect multiple phenomena in different sensory environments. However, a single point failure mode in these sensors will result in loss of any further data from the environment. Redundant sensors can be provided to avoid this problem, but the redundant sensors typically will not provide additional information, but rather simply act as prevention against failure.

These devices are quite limited in their application. For example, these devices typically do not provide non-local awareness of spatio-temporal phenomena and therefore cannot anticipate or track phenomena, such as a plume moving through the environment.

Airborne and space-based remote sensing systems possess the ability to forecast phenomena through data extrapolation of sensory conditions. This technology however, also has several drawbacks. The existing platforms already have high utilization rates for multiple tasks and the ability to redirect this capability may be limited. In addition, a limitation to the loiter/observation times of airborne and space based platforms exists due to orbital patterns, refueling needs and, in some instances, crew and operator limitations—particularly when observing transient or sporadic phenomena. There are also sensing and sensitivity limitations imposed via physics (i.e. sensing inside building/structures, subterranean, etc.). These systems also prevent raw data from being in the hands of end-users, instead requiring expensive and time-consuming post-data analysis before it is in readable form.

The present system defines use of simple sensor "pods" forming a sensor web. The pods may be heterogeneous or homogeneous. The pods collectively form a sensor web, where even though each individual sensor is extremely simple, the combination/network forms a multi-sensory, trans-environment detection capability with autonomous, reactive capability.

This approach may provide flexibility in adapting the observation and detection capabilities to site-specific needs. It allows for data fusion both locally as with single point sensor methods and over large scales as airborne and space-based methods. The costs and difficulties associated with a complex infrastructure may be minimized by the use of separated nodes, each of which is relatively simple, arranged in a wireless and power-managed web network. The use of the wireless network architecture, embedded in the environment, removes obstacles of single point failure found in single sensor alternatives and of loiter/observation times of space-based alternatives.

In an embodiment, the information can be shared among the Sensor Web pod elements throughout the web. This allows for an adaptive and reactive ability of the network as a whole.

Special aspects of the power management, and especially aspects of the power management which are counter-intuitive, are also described.

BRIEF DESCRIPTION OF THE DRAWINGS

These and other aspects will now be described in detail with reference to the accompanying drawings, in which:

FIGS. 17 and 18 show timing diagrams of operation.

DETAILED DESCRIPTION

The present application describes a number of Sensor Web nodes, which are typically wirelessly interconnected and communicate to form a macroinstrument from the groups of nodes. Each "node" on a Sensor Web can be either a specific individual pod, or another sensor web itself. The nodes can communicate amongst themselves. The communication causes distribution of information throughout the instrument as a whole. Throughout the description that follows, it is assumed that the nodes are pods, but it should be understood that the nodes can also be webs themselves.

Much as the intelligence in the brain is a result of the myriad of connections between dendrites, the Sensor Web effectively forms a macrointelligence as a result of the distributed information with the collection of pods reacting and adapting to their environment. The synergy between the pods provides information that is more than would be available from any of the pods individually. For example, the sensors collectively provide the ability to move from the scalar (point-like) information obtained from a single pod, to vector (direction and speed) information and interpretation. Moreover, the pods can be aware of sensed events not in their immediate vicinity.

By adding more pods, the Sensor Web can grow, and/or replace failed pods and/or evolve, such as adding more powerful processing structure or the like. For example, a hardware update may allow more advanced features to be carried out. This can be implemented by adding new pods, with these improved characteristics, into the Sensor Web.

Figure 1:
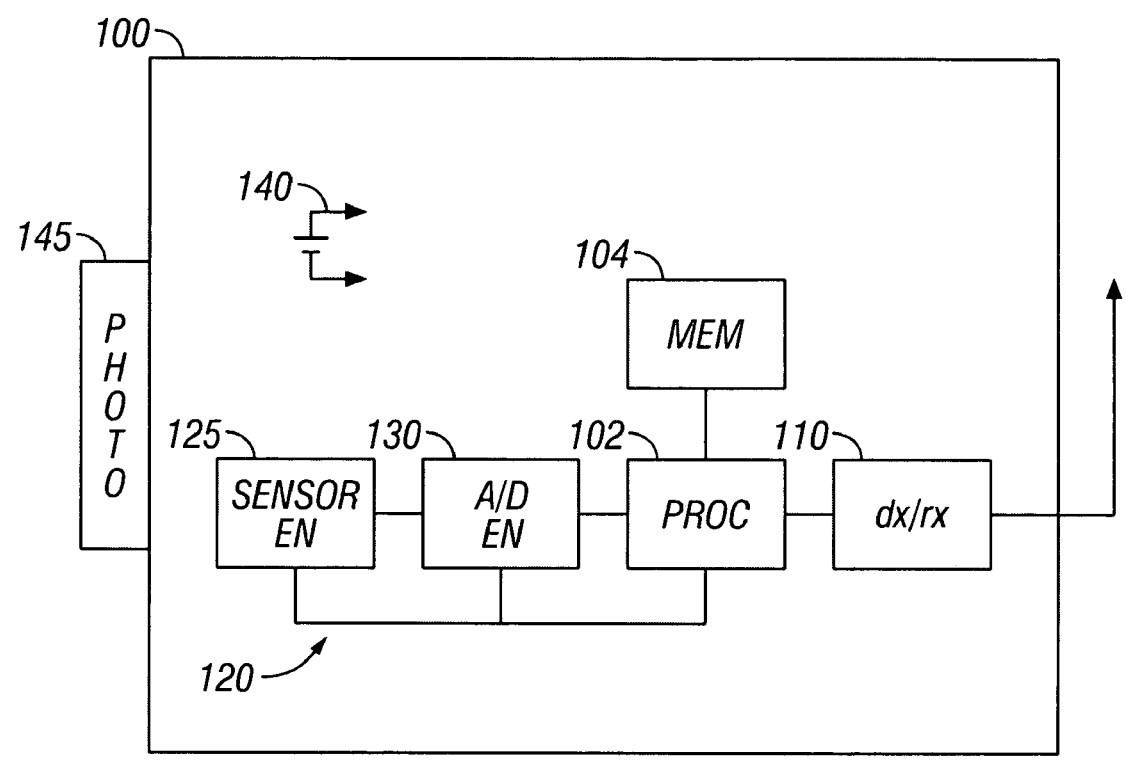
FIG. 1 shows a simplified block diagram of a single sensor pod element forming a node of the sensor web.

A block diagram of a circuit forming an individual sensor pod is shown in FIG. 1. The sensor pod includes processor 102 which runs a stored program of the type described in the flowcharts herein, such as FIGS. 5A and 5B. Both the program and data may be stored within the working memory 104. A transceiver 110 allows communication to and from other pods. This may be done by any available frequency and/or format. In an embodiment, frequency shift keying can be used for the communication over the 916 MHz (ISM) band. A sensor assembly 125 includes connections for the Sensor itself. which can be any of the different sensors described herein, and may include an A/D converter 130. An energy storage part 140 may be a battery or the like. In addition, there may be an external power generator such as a photocell 145 or windmill to generate additional power to charge the battery.

While this shows a preferred example of the sensor pod that can be used, it should be understood that other processors, sensors, transmission standards, and configurations can alternatively be used, so long as they support certain functionalities.

Figure 2:
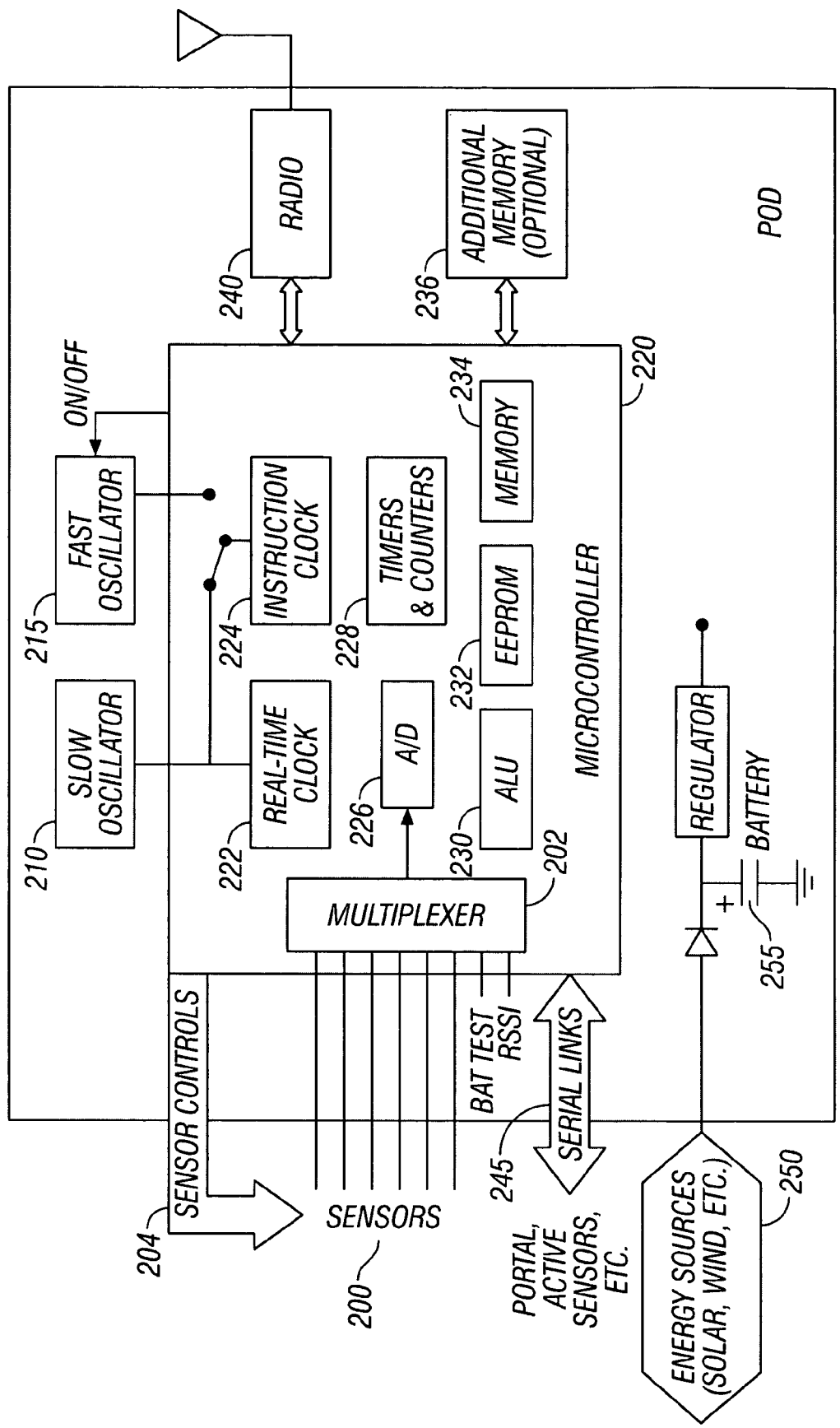
FIG. 2 shows a more detailed block diagram.

FIG. 2 shows a more detailed block diagram of a pod. In this block diagram, it is assumed that the Sensors are external to the pod itself. A number of different sensors can be provided, which are separately input to a multiplexer 202. These sensors can also be controlled via control 204 which can for example initiate detection of the sensors.

Each pod also includes a slow oscillator 210 which operates during power restriction, and a fast oscillator 215 which is turned on for increased processor operation. A microcontroller 220 includes standard microcontroller parts including a real-time clock 222, instruction clock 224, A/D converter 226, timers and counters 228, and arithmetic logic unit 230, EEPROM 232 and working memory 234. Additional memory 236 may also be used, to store various parameters. The microcontroller communicates to a radio 240 which may be a transceiver or may be a separate transmitter and receiver. In addition, each pod includes serial links 245 which enable communication with serial sensors or communication with the user interface portal.

Power may be provided by an energy source shown as 250, which charges an internal battery 255.

Figure 3:
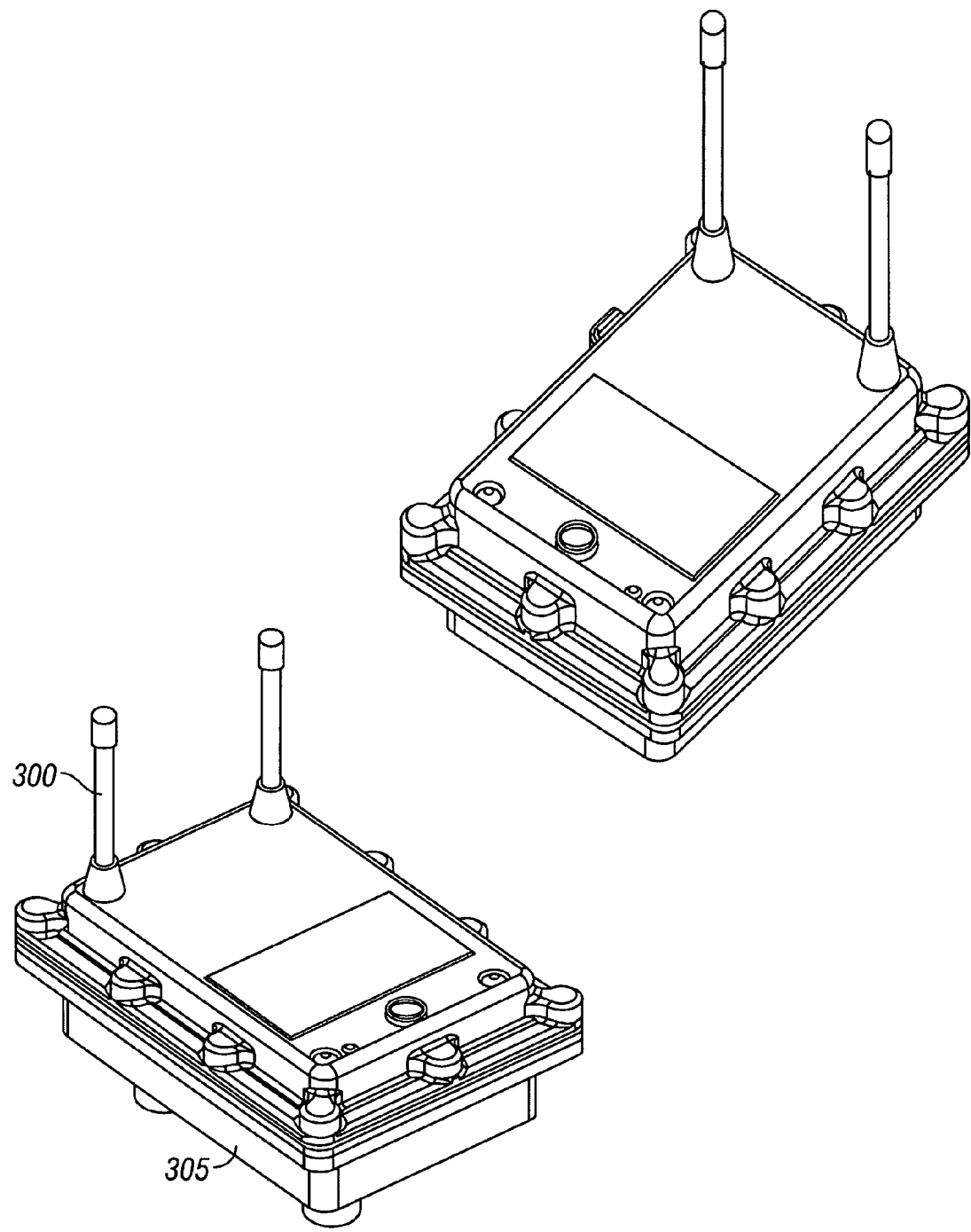
FIG. 3 shows an exemplary drawing of the packaging of the Sensor pods.

FIG. 3 shows an exemplary external configuration of the pod. The pod is shown with external antennas 300, a weatherproof sealed casing 305, and may also include external jumpers and controls.

An overall flowchart showing the operations which are carried out by the pods is shown in the following flowcharts. It is important to note, however, that the functions carried out by the individual pods are most important when considered in conjunction with the entire web.

The decentralized nature of the architecture provides for data sharing throughout the rest of the web. This pod-to-pod communication is both: omni-directional and also bi-directional which allows end-users not only to receive information from the Sensor Web, but also to send instructions into the web formed by the collection of pods. Instructions can originate from either the end-users or other pods within the system. The present system goes against the conventional teaching of "routing", and instead uses omnidirectional and bidirectional communication. Moreover, this concept of retransmitting everything that the unit hears can be made to be more, not less, energy efficient than traditional schemes.

Data arrives at each pod via (a) direct measurement from its own sensors and (b) communicated information from neighboring pods, in the form shown herein. The pod then interprets (or reinterprets) the total incoming data (as described herein), broadcasts some combination of the actual measurements and digested data to any pod within range, and the process continues. Examples of post-processed data may include calculations of gradients of scalar quantities by using the distances between pods (as determined from GPS values) and the local and non-local scalar values. Certain portal pods may be linked (by Internet, satellite, rf modem, cell phone, etc. and even hard wire) so that the end-user of a particular Sensor Web may be, in fact, another web.

Figure 4:
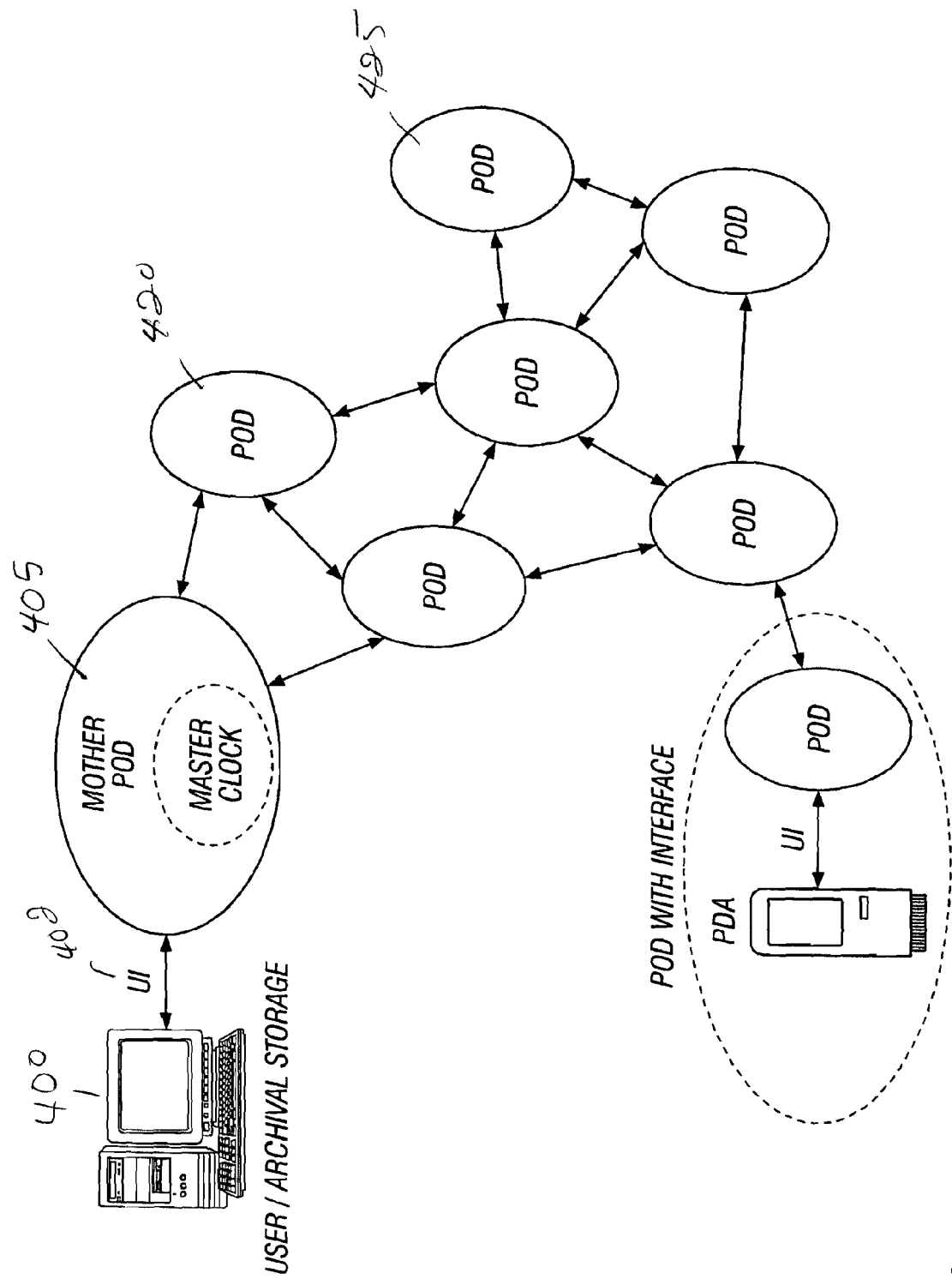
FIG. 4 shows a block diagram of communication connections among pods.

An operational Sensor Web is shown in FIG. 4. FIG. 4 shows the end-user 400, who can be the operator that controls the system, connected via a user interface portal 402 to a "mother" pod 405. The mother pod also contains the master clock pod that is used to synchronize all pods in the system. The functions of a portal and master clock need not be both co-located on the same pod. In fact, multiple pods may contain user interfaces (such as PDAs) where commands can be inserted in the system. In addition, it is possible to transfer the master clock from the mother pod to another pod as part of the operation. It is only when both a portal and a master system clock both reside on the same pod that the pod is termed a "mother". Typically the mother pod is associated with the interface server and hence, the archival database of sensed information from the Sensor Web, but other configurations are possible.

In operation, a pod is assigned an address of 0, and becomes the Master Clock (and in this case a Mother pod) by virtue of its address. All other pods in the system will then synchronize with the clock that is sent by pod 0.

An important aspect of this system is that Clock information is treated like any other measured data on the Sensor Web. The clock information is sent as data among the pods, as described in further detail herein. Besides these two functions, the mother pod is no different than the daughter pods and, in fact, the mother pod may have a sensor and collect data like all other pods.

The portal interface at the mother pod can either be a serial port into a computer, a wireless Internet board (e.g. 802.11), a satellite link, PDA connection, etc. Interfaces demonstrated have included serial lines into stand-alone computers as well as servers which then relay the information into or out of the Internet.

A number of other pods shown as 420, 425 are also provided. As discussed above, however, any number of pods may be provided.

In an embodiment, the data is passed from pod to pod using a technique called a flooding algorithm. According to the flooding algorithm, data is passed to any pod within listening range and the processes is repeated so that the data hops pod-to-pod until it is dispersed throughout the Sensor Web. In an embodiment as disclosed herein a time slicing technique is used, where each pod is synchronized with the master clock, and each pod has a specified broadcast time during the duty cycle to pass along what information it has heard. This may allow all information to be transmitted on a single frequency. In another embodiment, however, multiple frequencies may be used for example to provide separate communication among mother pods, or to allow for two or more co-spatially deployed Sensor Web systems to run without interference from each other, or for additional information handling capabilities. Other communication techniques may be used; For example, while the presently preferred Sensor Web has used On/Off Keying or Frequency Shifted Keying, Spread Spectrum radios could also be used.

The protocol defines a Sensor Web cluster as the set of all pods that are associated with a particular master clock 412 in FIG. 4. There are N pods in a cluster, and this size is closely associated with the broadcast slots in the time-sliced protocol. A clump is a group of pods around a given pod P, such as pod 425, that is in communication range of pod P. The maximum clump size for a given cluster is denoted as C and is one more than the maximum number of broadcast neighbors, of any pod. A pod may have more broadcast neighbors than physical neighbors.

Figure 5A:
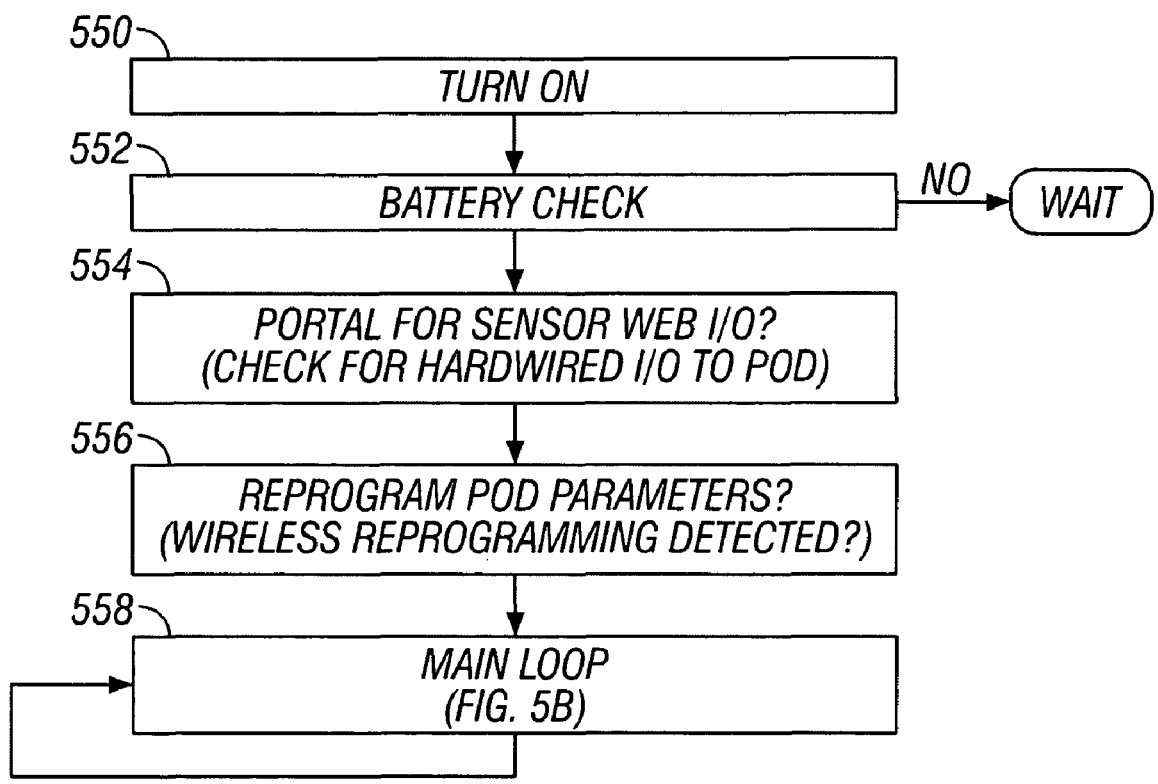
FIGS. 5A and 5B show the main flow of the pod operation.

An initial startup operation of each pod is flowcharted in FIG. 5A. In each operational cycle of a single cluster, the protocol follows the flowchart of FIG. 5B.

The initial startup routine shown in FIG. 5A starts when the pod is first turned on at 550. Initially, the pod carries out a battery check, to make sure that the battery is adequate for the current situation. If the battery is inadequate, then the pod waits in a low-power state until the battery is sufficiently charged up.

At 554, the pod checks to see if it is a portal for the Sensor Web I/O. This determination involves ascertaining if the pod has been hardwired to an I/O device such as 400. The I/O device may be a computer or PDA. At 556, the pod broadcasts key parameters that determine its configuration and initialization. This may include sensor calibrations, initialization parameters like maximum number of pods expected in the Sensor Web, slot sizes, data message sizes, number and type of sensors attached to the pod, in addition to any or all of the firmware protocols, etc. The pod then checks to see if a response is received from a programmer (either wirelessly or wired) to change any of these parameters. The communication is preferred to be wireless but may also be via wired protocol.

A programmer routine can send new information to the pods, and receive information from the pods. An example screen shot of the way that information can be sent to the pod and received from the pod is shown in FIG. 5C. Note that the pod can receive information such as their node ID, and other various initialization parameters. In addition, the pods can send their individual data shown as 510. When the programming is complete at 556, the system begins executing the main loop 558 which is shown in more detail in FIG. 5B.

Figure 5B:
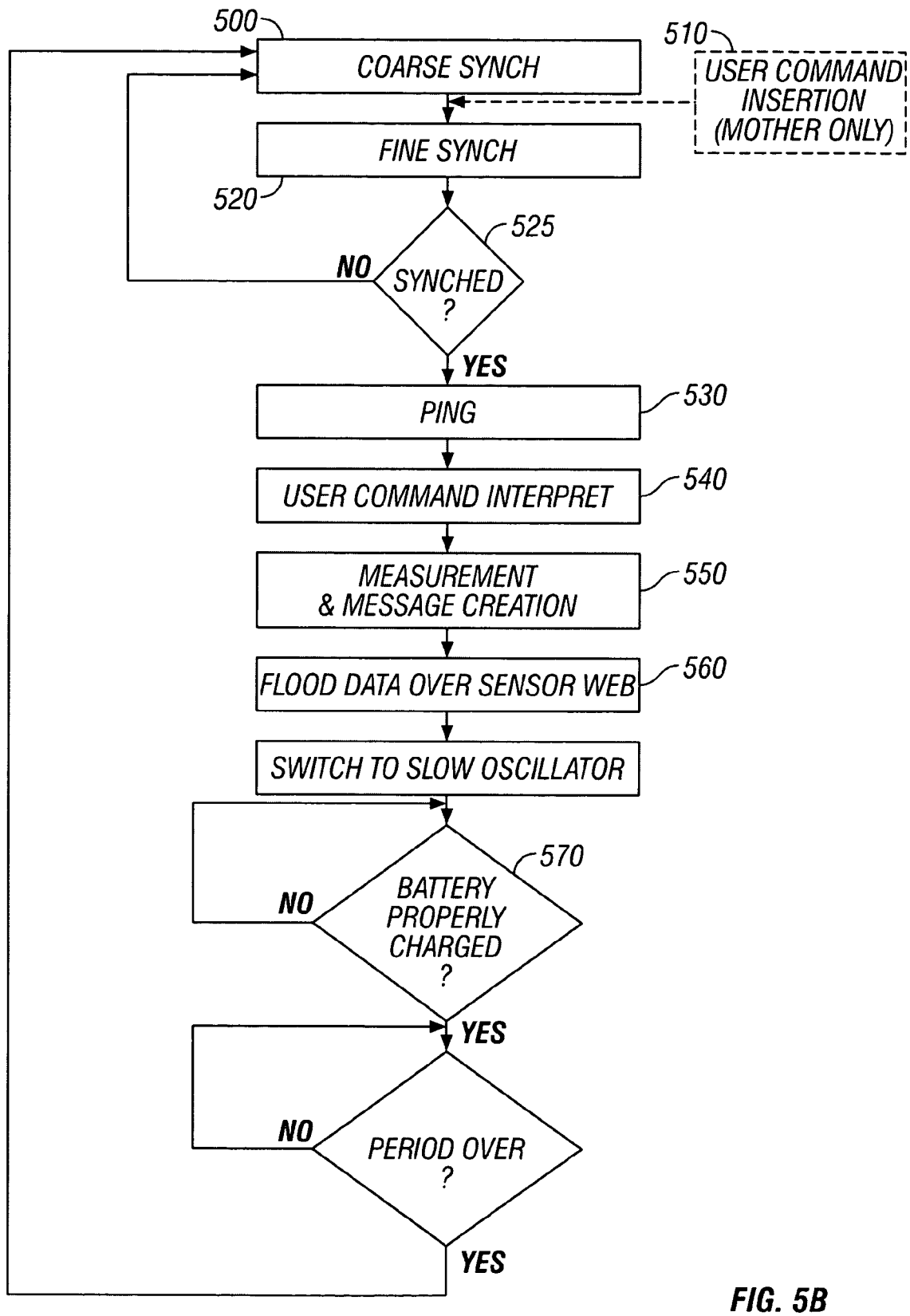
Figures 5C, 6:
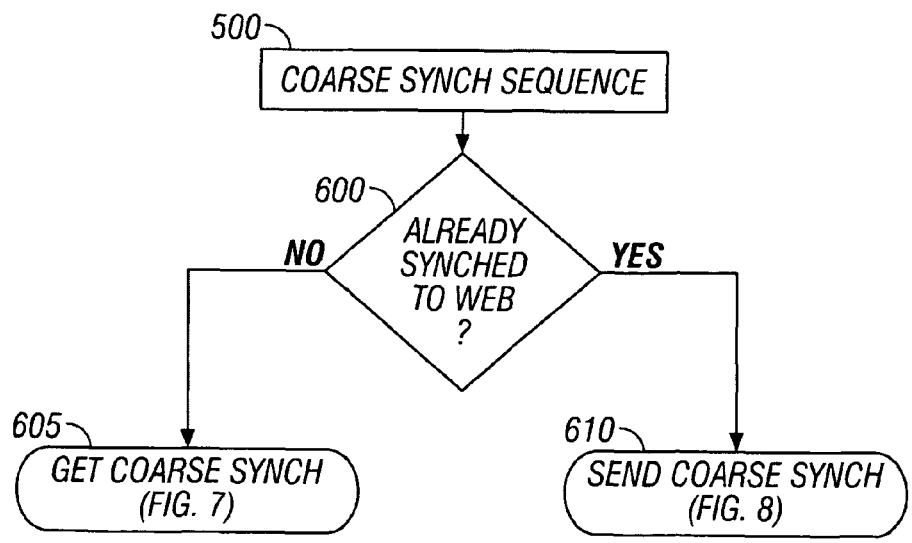
FIG. 5C shows an example user interface for controlling the web.
FIG. 6 shows a flowchart of the beginning of the coarse synch sequence.

The main loop of FIG. 5B begins at 500, where the protocol follows a coarse synchronization phase.

The purpose of the coarse synchronization is to establish, for each pod, the presence of a local clump of pods. Initially, the first member of the Sensor Web is the mother pod 405, which contains the master clock 412. At first, no other pods are yet synchronized with the master clock's transmissions.

Figure 16A:
FIGS. 16A and 16B show a diagram of the form of the data transmission for coarse and fine synch respectively.

Each pod joins the cluster by starting out in coarse-synch reception mode, shown in further detail in FIG. 6. FIG. 6 shows an initial part of the coarse synch sequence 500. At 600, the pod determines if it is already synched. If not, then the pod gets the coarse synch at 605; shown in more detail in FIG. 7. If the pod is already synchronized, however, then the pod sends the coarse synch at 610, shown in further detail in FIG. 8 as described herein. The data packet for the coarse synch phase may be as shown in FIG. 16A. This can include a data synch header 1600, followed by the real time clock information 1605, and some error check bits 1610. The real-time clock used in the coarse sync phase is presently three bytes but of course can be of any length. The two lower bytes includes a two second counter, and the Upper byte includes the number of two second ticks. The clock also includes information indicative of the offset for the receiving pod to account for delays in transmission.

The overall clock is only five bytes long, and is maintained relatively short so that it can be effectively received using the slow oscillator.

Figure 7:
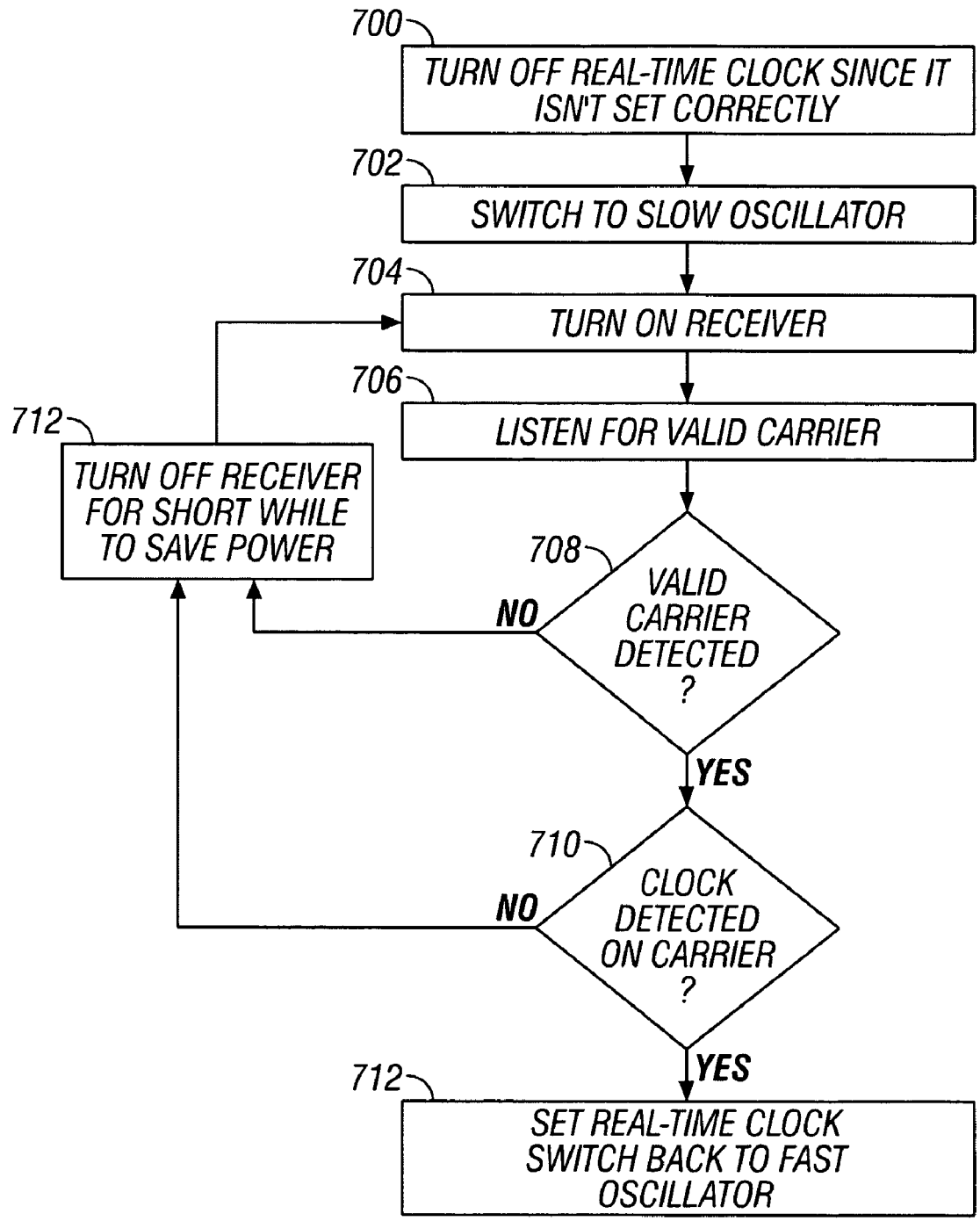
FIGS. 7 and 8 show flowcharts of additional portions of the coarse synch sequence.

The "get coarse synch", is shown in FIG. 7. Note that this routine is only used if 600 detects that the internal clock is not already synchronized to the rest of the Web.

An initial operation at 700 operates to turn off the real-time clock, noting that the real-time clock is not at this point set correctly. At 702, the processing is switched to a slow oscillator. This slow oscillator is used to enable a periodic (in time) short listening operation in a low-power manner.

The short listen operation may be carried out every 234 msec by turning on a receiver for 10 milliseconds in order to attempt to hear a coarse synchronization signal. To effect the short listen, the pod turns on its receiver at 704 and listens for a valid carrier at 706. If a valid carrier is detected at 708, then the system looks for the clock on the carrier at 710. If a valid carrier is not detected at 708, however, the system turns of the receiver at 712 in order to save power.

The operation of detecting the clock requires the pod to determine whether it has received a "coarse synch" pattern or a carrier associated with the coarse synch pattern, that enables it to receive clock transmissions from the mother pod or pod already synchronized to the mother pod. If not, the loop continues, and another listen is carried out 234 milliseconds later. A pod turns on its receiver very briefly (e.g. for 10 msec in the present configuration) in hopes of hearing the carrier signal for which the cluster is configured. Therefore, if the pod detects either the synch signal or carrier during its short listen, then it continues to listen. If not, the pod turns off. However, if the clock is detected, then the real-time clock is sent to the detecting clock at 712, and returns at that time.

This brief receiver turn-on/off is known as a "short listen" and allows the Sensor Web pod to be aware of its environment while still conserving power. During the coarse synch phase of each cycle, each pod that is currently a member of the cluster—initially, only the master clock pod (often the mother)—transmits a "coarse synch" pattern throughout the coarse-synch slot corresponding to its pod number. Each coarse-synch slot is 284 msec in length (so that it is slightly longer than short listen periodicity), so the total duration of the coarse synch phase of each cycle is (284*N) msec.

This scheme allows for new pods to join the web in a minimum of one full duty cycle of the main loop. It does not require much power (unlike fine synching, see below) but is not precise enough to establish timing for the Sensor Web pod transmissions. The use of a slower oscillator to clock the pod, allows saving power by slowing the rate at which the processor carries out its operations. Significant power could otherwise be lost when a pod is trying to listen and join in the Sensor Web. Keeping any listening pods—until they join the Sensor Web aggregate—in a slower oscillator mode will substantially save power. Only pods that are presently synched with the Sensor Web use their fast oscillator. For example, operation using a slow oscillator may draw 10 times less power than a faster oscillator clocking the system. In addition, the short listen sequence further reduces power consumption, regardless of local oscillator speed.

Figure 8:
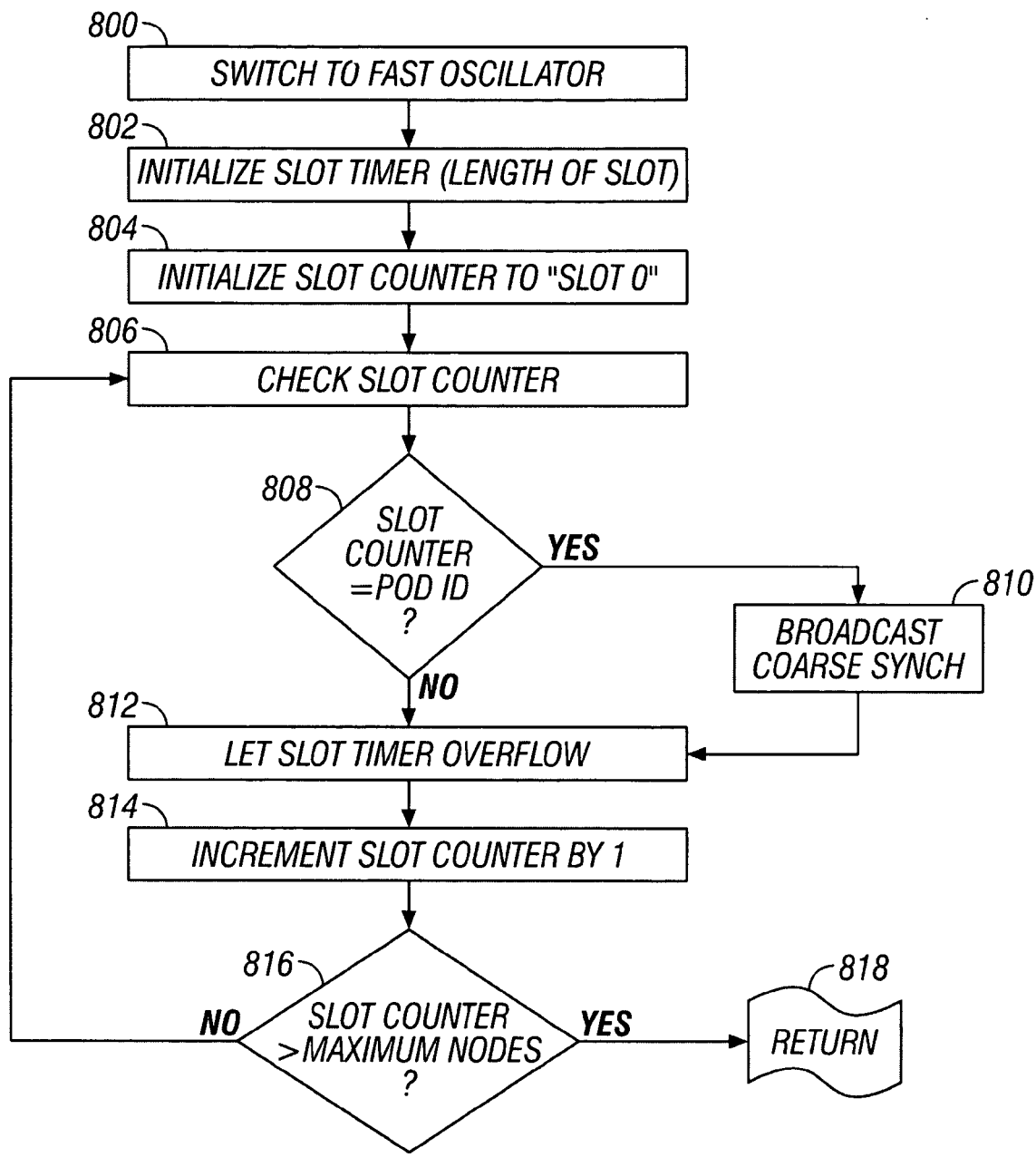

If the system is already coarse synced, then the flowchart of FIG. 8 is followed, in which the now-synched pod sends its coarse sync for use by other units which may be out of listening range of the master clock/mother pod. Initially, the system switches to the fast oscillator at 800, and initializes its slot timer at 802. The initialization sets the slot timer to the length of a slot. The slot counter is also initialized to slot 0, at this time. Then, at 806, the system checks the slot counter. If the slot counter is set to the pod ID at 808, then the pod broadcasts a coarse synch at 810. If not, the slot timer is allowed to overflow at 812, and is incremented by one at 814. When the slot counter reaches the maximum node value at 816, the flow returns to the main loop at 818. Note that all pods will exit this routine at the same time. Note further that the maximum node value may be greater than the number of physical pods presently in the Sensor Web which will allow additional pods to be added to an already operating Sensor Web.

After the coarse synch at 500, there is a command insertion phase at 510 which is a brief idle time after the coarse sync. In the command insertion phase, the mother pod 405 checks to see if any command/data packets exist on the user interface queue 400. This packet can be directed specifically to a particular pod address, or globally to the entire Sensor Web. The packet received from the user interface, if not intended exclusively for the mother pod, will be packed together with the upcoming Fine Synch packet.

Notice that even if a pod is not the target of a command, it will still see the command sent out and therefore be aware that another pod is being commanded. Examples of these commands which can be inserted include real-time pod address reassignment, radio squelch adjustment, handshaking a pod's interrupt request, adjustment of main loop period, timing parameters, sensor recalibration, switching an actuator connected to a pod, etc. Notice also that commands entered into the mother/master clock are executed within the same main loop cycle because they are packed with the clock signal. This is different from commands entered into the system via other pods, which may require more than one main loop cycle to propagate out as described herein.

Fine synch is carried out at 520. However, this is only carried out for pods already part of the Sensor Web, that is for those pods that have been coarsely synchronized with the master clock in the current cycle or fine synched in the previous cycle. The fine synch cycle propagates a single, precise time throughout the Sensor Web in anticipation of data transmission. The fine synch cycle allows the system to have tight transmission/reception windows making more efficient use of the time slicing and bandwidth available as well as further lowering power by only requiring the receiver to be on in short time windows. Currently this operation is performed every main loop cycle, however, depending upon oscillator quality and Sensor Web environment (for example) it may not need be done thereby further reducing power consumption.

The fine synch phase of each main loop has H subcycles (where H is the number of data hops for information to traverse the entire Sensor Web cluster) of N fine synch slots each, where each fine-synch slot is presently 70.8 msec in length; the total duration of the fine synch phase of the cycle is (70.8*N*H) msec. Again, H may be greater than the physical number of hops in the Sensor Web to allow for pods to be added later to expand the spatial scale of the Sensor Web. During each fine-synch slot:

The pod with the address corresponding to that slot transmits the current clock value for this cycle, provided that either:
  a) it is the mother pod, and this is the first fine synch subcycle, or
  b) it received the current clock value on a prior fine synch subcycle.

Each other pod that has not yet received the current clock value for this cycle short-listens and, if it detects carrier, receives the transmitted current clock value.

The fine synch is designed to allow for differential timing drifts across the web (as a result of local oscillator drift caused by such things as oscillator part variation from pod to pod or differential heating across the Sensor Web) to be put back in synch with each cycle. This reduces the overall system jitter buildup over multiple cycles of the main loop.

Figure 16B:
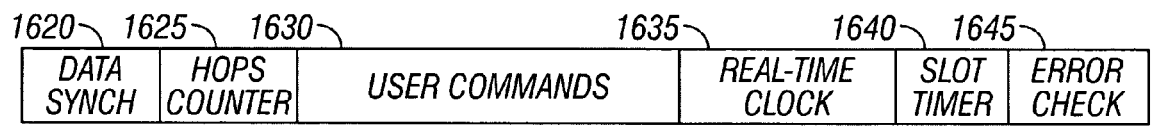

Any command/data packets that have been received from the user into the mother pod/master clock, are embedded with the clock and propagated out to all pods during this phase. The present protocol design, uses the command/data packets of the general form shown in FIG. 16B, having eighteen general purpose command bytes 1630 in addition to the real time clock information 1635. These bytes are preceded by a data synch header byte 1620, and a hops count value 1625 which is used as a diagnostic and determines a pod's distance from the master clock. A pod only responds to the command bytes that are directed to it, or sent using a "broadcast" (global) address. The end of the packet includes the slot timer 1640, and an error check value 1645. The slot timer includes an offset to account for the inherent time delays associated with hopping the clock information through the Sensor Web and ensures that all pods have precisely the same real-time clock after being synchronized. The real-time clock for the fine sync phase is similar to coarse sync. The slot timer is 1 byte used to time the transmit and receive slots. This includes an offset to account for delays. The hops count is a diagnostic that is resent during the flood phase to determine a pods distance from the mother pod. This counter is incremented during every retransmission during fine synch.

The user command area can be 18 bytes and the present total packet length is 25 bytes.

Figure 9:
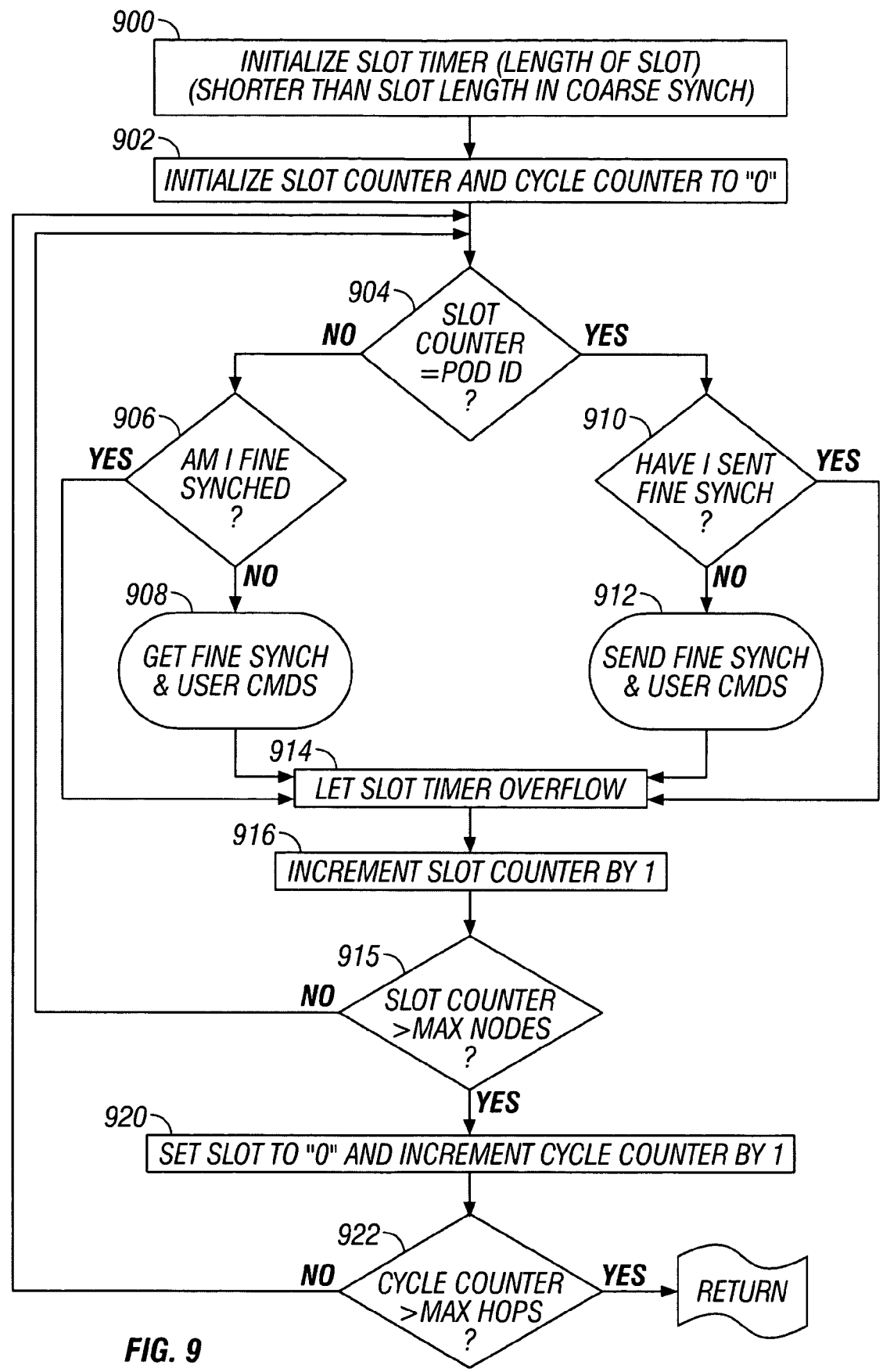
FIG. 9 shows an overall flowchart of the fine synch sequence.
Figure 10:
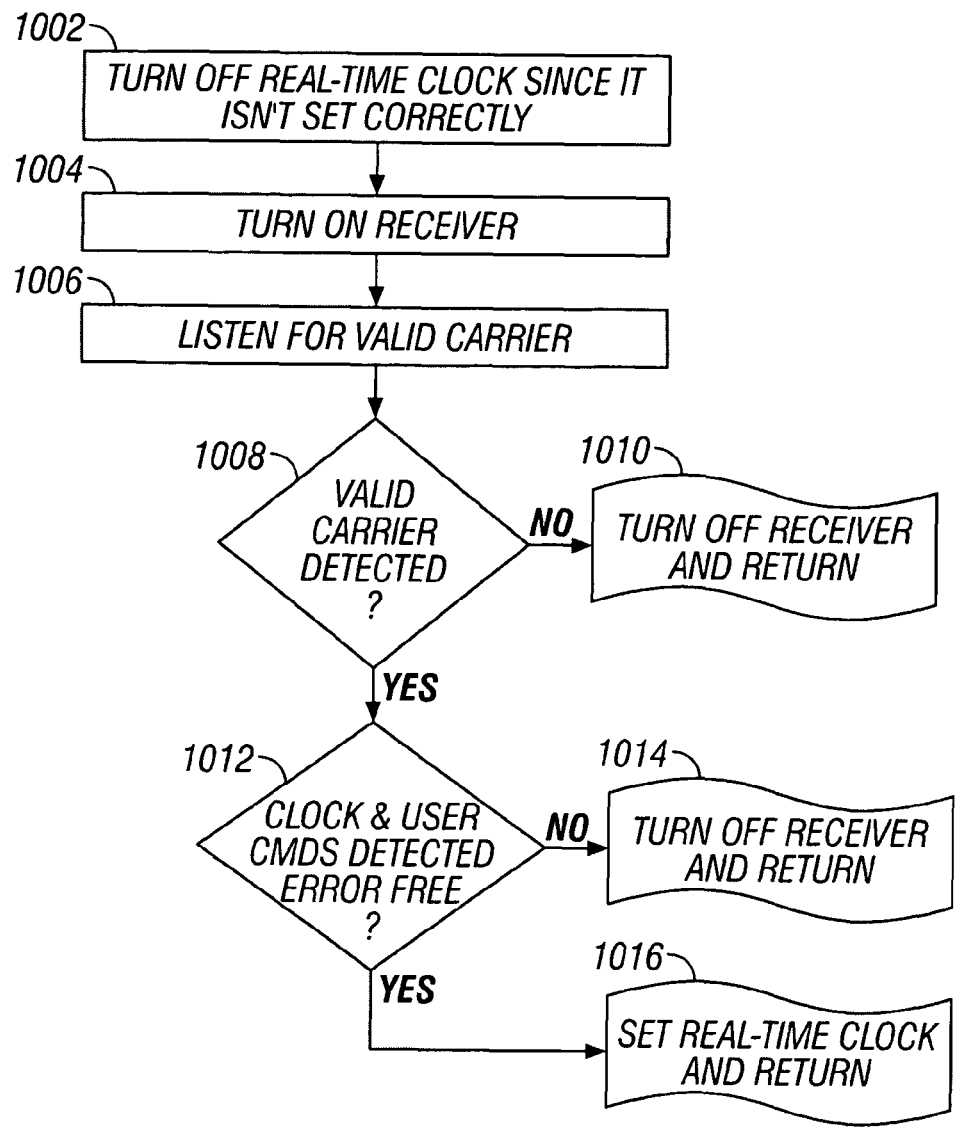
FIGS. 10 and 11 show additional aspects of the fine sync sequence.

The fine sync sequence follows the flowchart of FIG. 9. Initially, the slot timer is initialized to the length of the slot at 900. The slot counter and cycle counter are initialized to zero at 902. This begins the loop, where the pod determines if the current value of the slot counter is equal to its pod ID. If not, the system determines if it is fine synched, and if so gets the fine sync at 908, using the technique shown in FIG. 10. If the system is fine synched at 904, then it determines if it has sent a fine synch at 910, and if not sends that fine sync at 912. Then, like in previous operations, the system allows the slot timer to overflow, increments the slot counter by one, and determines if the incremented slot counter is more than the number of maximum notes. If not, flow returns to the main loop, and if so, the slot is set to zero, and cycle counter is incremented by one at 920. If the cycle counter is more than the maximum number of hops at 922, then the system returns the main loop. Again, because of the overflow conditions, all pods exit this routine at the same time. The operation of getting the actual fine synch, and user commands embedded within the fine synch, is shown in FIG. 10. At this point, it has been determined that the current pod is not yet fine synched. Accordingly, the real-time clock is turned off or disabled at 1002. Then, the system turns on the receiver at 1004 to listen for a valid carrier at 1006. If a valid carrier is not detected at 1008, the receiver is turned off at 1010 and returns. However, if a valid carrier is detected at 1008, then 1012 detects whether the clock and the user commands have been detected to be error-free. If not, again the receiver is turned off and returns at 1014. If the clock and/or user commands are detected, the real-time clock is synched at 1016.

Figure 11:
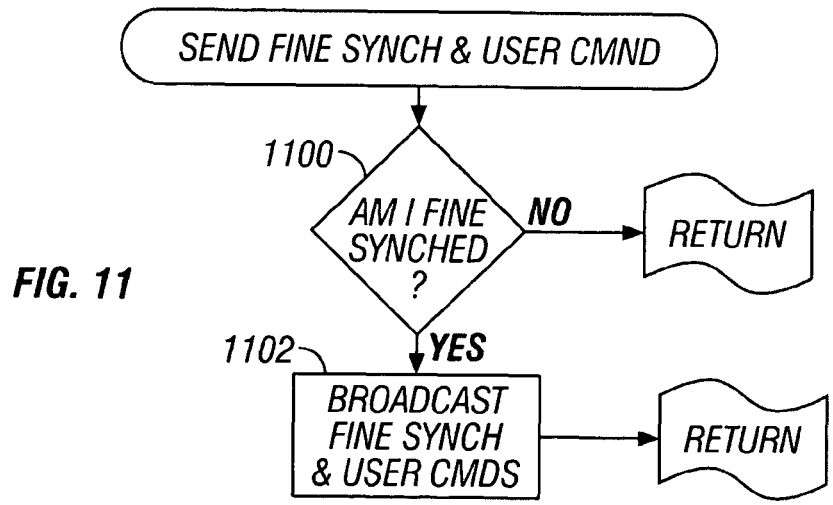

FIG. 11 illustrates the fine synch "send" operation which is carried out when the system determines that it is already fine synched. The detection of the fine sync occurs at 1100, and if the system determines that it is fine synced at 1100, then, at 1102, it broadcasts the fine synch and the user commands.

After the system is synched at 525, the ping phase follows at 530. The ping phase of each main loop cycle gives each member of the Sensor Web an opportunity to compile an updated list of its neighbors. The phase consists of N ping slots which are presently 35.4 msec long, so the total duration of the phase is (35.4*N) msec. During each ping slot:

The pod corresponding to that slot transmits its pod number.

Each other pod short-listens and, if it detects carrier and then receives the pod number corresponding to that slot, adds the corresponding pod to its list of neighbors.

The ping cycle is important because this determines the contents of the local broadcast neighborhood around each pod. This way, each pod will only listen during the data flood phase when it expects one of its neighbors to be transmitting. This will reduce power consumption by minimizing receiver turn-on time.

Figure 12:
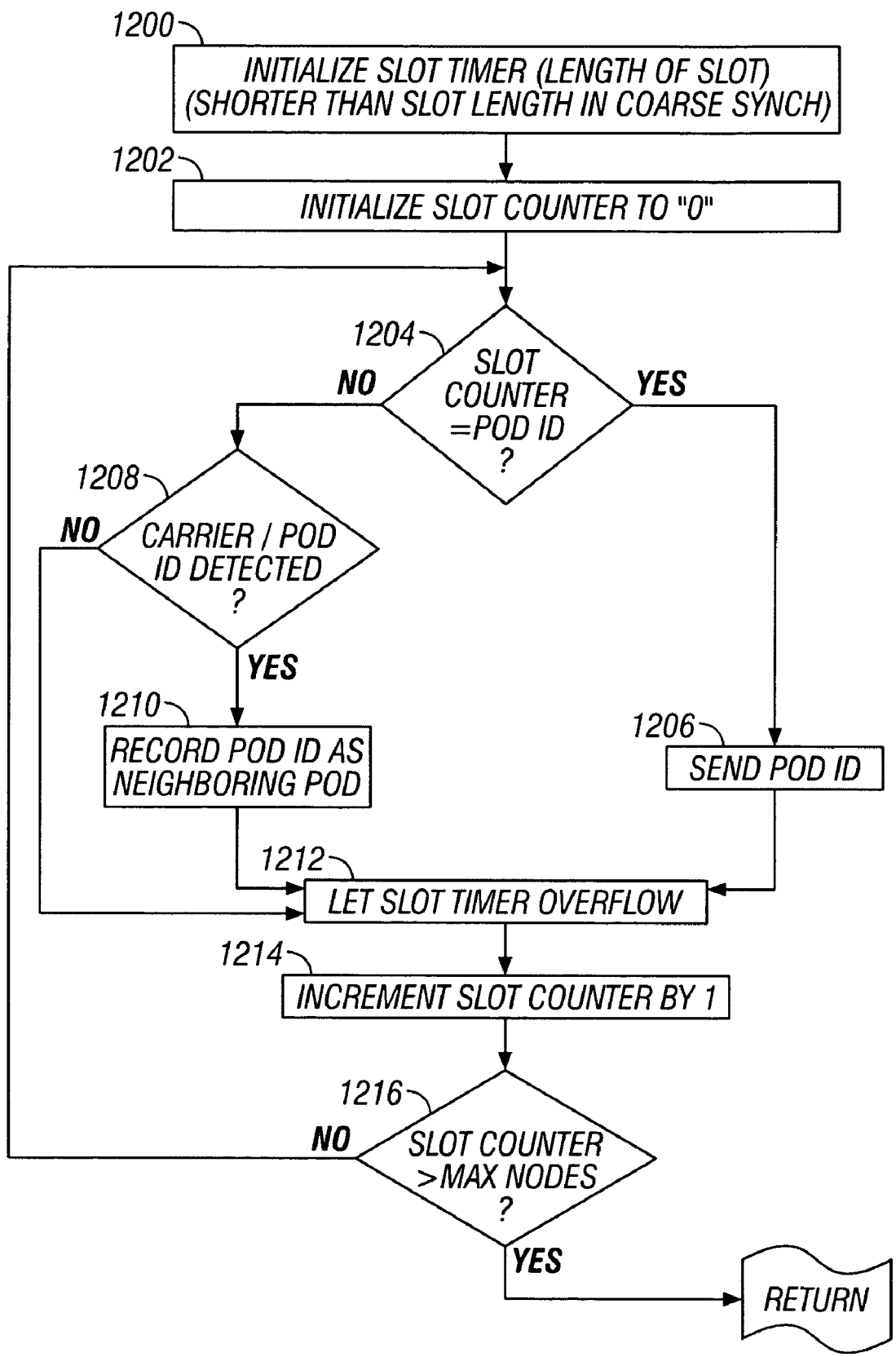
FIG. 12 shows the ping sequence, which is used to determine other neighboring sensor pods which are within the area of the broadcasting sensor pod.

The ping operation follows the flowchart shown in FIG. 12. Effectively the ping sequence operates similar to that described previously, to determine the neighboring pod IDs. At 1200, the system initializes the slot timer to the length of the slot, and then initializes the slot counter to zero at 1202. At 1204, a determination is made of whether the slot counter is equal to the pod ID. If so, then the pod ID is sent, effectively within its own slot counter, to be received by other neighboring pods. At 1208, since the current slot is not the slot intended for the current pod, a determination is made of whether carriers from other pods have been detected. If so, then the data from the broadcast neighbor pod is recorded.

The system continues by allowing the timer to overflow at 1212, and incrementing the slot counter by one at 1214. If the slot counter has not reached the maximum number of expected nodes at 1216, then the main loop is repeated. Recall that the number of expected nodes can be greater than the actual number of physical pods to allow for Sensor Web growth via pod drop-in. Again, all pods exit this routine and return to the main loop at the same time.

Many commands can affect both the internal operation and properties of the Sensor Web and the way it reacts to the environment. Any commands not entered into the system via the mother pod are interpreted at 540, prior to Measurement Phase. For example, a pod may be commanded to run a special routine which sends and receives serial data to/from a sensor that is wired to it. If timing parameters related to synchronization are commanded to change, they will be acted upon during the next sample period. Any commanding of I/O switching (e.g. actuating an external component attached to a Sensor Web pod via a power transistor internal to the pod) is done at this time. Other things that can be performed include:

1. Activating local sensors only when appropriate. For example, some sensors have finite lifetimes as a result of limited power, limited chemical reagents, limited local resources (e.g. nematode biotoxin sensors), or limited media (e.g. picture in a camera). As a result of the information sharing, these sensors would only be activated when outlying regions of the Sensor Web indicated a possible phenomenon of interest was passing through. Pods can be aware of conditions and trends not local to them. The Sensor Web internally regulates and manages it's own resources in an optimum manner as a result.

2. Activating local actuators for a variety of purposes. For example, distributed soil moisture sensors would allow precision micro-irrigation techniques including valve turn-on and water routing.

a. Commands to actuate can occur locally based on data flowing from other pods.

b. Commands to actuate can originate from other pods non-locally the specifically request the action.

Figure 13:
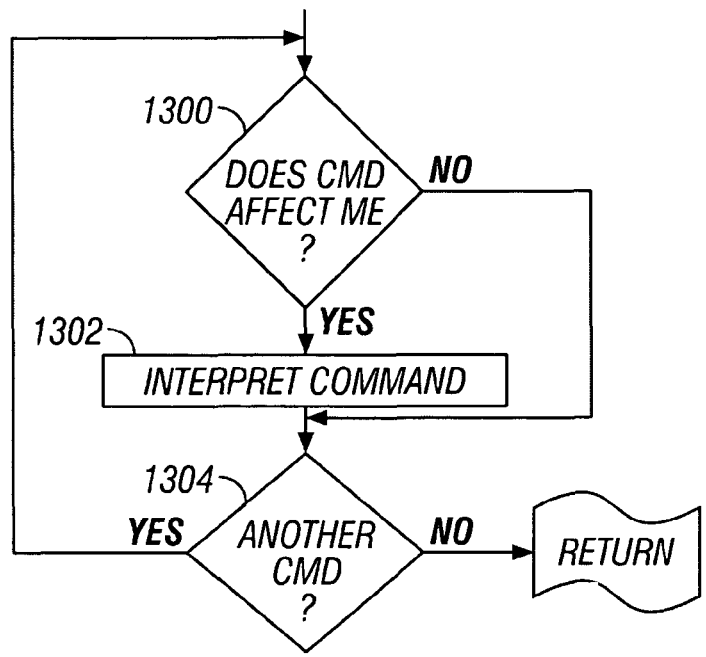
FIG. 13 shows the user command interpret sequence.

This portion of the main loop cycle has a fixed duration, currently between 100 msec and 1 second, depending on the configuration of the Sensor Web and its component pods. The command interpretation portion of this phase is carried out according to the flowchart of FIG. 13. At 1300, each pod determines, based on a number in the command, whether the command effects that specific pod. Alternatively, global commands may affect each and every pod. The commands may be in the form (command, address, argument 1, argument 2. . .) where the address can be a specific pod, all pods, or perhaps a group of pods. If the command effects the specific pod, it is interpreted at 1302. 1304 determines if there is another command, and if not, flow proceeds to the main loop.

During the measurement portion of this fixed duration phase, all members of the Sensor Web concurrently sample and/or communicate with their sensors and record the resulting measurements. All of the measurements taken at any single pod are collected into standard-sized messages (currently 16 or 32 bytes), along with additional information used in protocol operations, for transmission to all other members of the Sensor Web during the ensuing data transmission phase of the same cycle.

Because the clock is synchronized among the pods, the measurements throughout all the pods of the entire web are made essentially simultaneously.

A pod may also take more data than it can fit into a standard-sized message. The pod can send this extra data by packing it into "virtual pods". A virtual pod message is similar in format to other measurement packets, except that its header contains special address information.

Individual pods can initiate commands into the Sensor Web based on their present awareness of specific sensor data. This command information is also included in the measurement packet and resides as both flags and/or arguments in the transmitted bytes. This data will flood to all other pods during the upcoming Data Flood Phase. As a data packet passes through a pod, the pod can interpret and react to any flags and command arguments.

TABLE 1

Sensor Web Slot Scaling where N is the maximum number of pods in the Sensor Web, H is the maximum number of data hops to traverse the Sensor Web, and C is the maximum clump size and is directly related to the length of time allowed for any pod to transmit

| Step | Name | Objective | Scales as |
|---|---|---|---|
| 1 | Coarse Synch | pick up lost pods | N |
| 2 | Fine Synch | synchronize all pods, send out user commands | N * H |
| 3 | Ping | get local neighborhood | N |
| 4 | Command Interpretation and Measurement | create/react to commands, collect data, | constant |
| 5 | Flood* | transmit data throughout web | N * H * C |
| 6 | Dormant | conserve power, interpret and analyze data received | constant |

560 represents the Information Flood Phase, during which each of the sensor web transmits its own message(s) and (barring transmission failure) receives and retransmits all of the packets transmitted by all other members of the sensor web.

The flood phase consists of H subcycles of N flood slots each, where, again, H is the maximum number of hops required for data to traverse the Sensor Web cluster. In the worst case (a string of pods in series, where each pod is in direct communication with only one pod that is closer to (fewer hops from) the mother (master clock) and at most one other pod that is further from the mother), H is (N-1).

During each slot of each flood subcycle, the pod corresponding to that slot will:

Transmit its own message, unless it transmitted that message during a slot of a prior subcycle. (That is, on the first subcycle of the phase, every member of the cluster transmits at least its own packet.)

Transmit (relay) all messages that it has received so far in this cycle's flood phase and has not yet relayed.

Transmit any virtual pod messages it might have.

Notice that each pod will broadcast any one message only once. This prevents overwhelming the Sensor Web with transmitted data. Each other pod short-listens (even though it is expecting a neighbor to transmit in this slot so as to conserve power) and, if it detects carrier, receives all packets transmitted during the slot and retains them for relay transmission at its next transmission opportunity.

Figure 14:
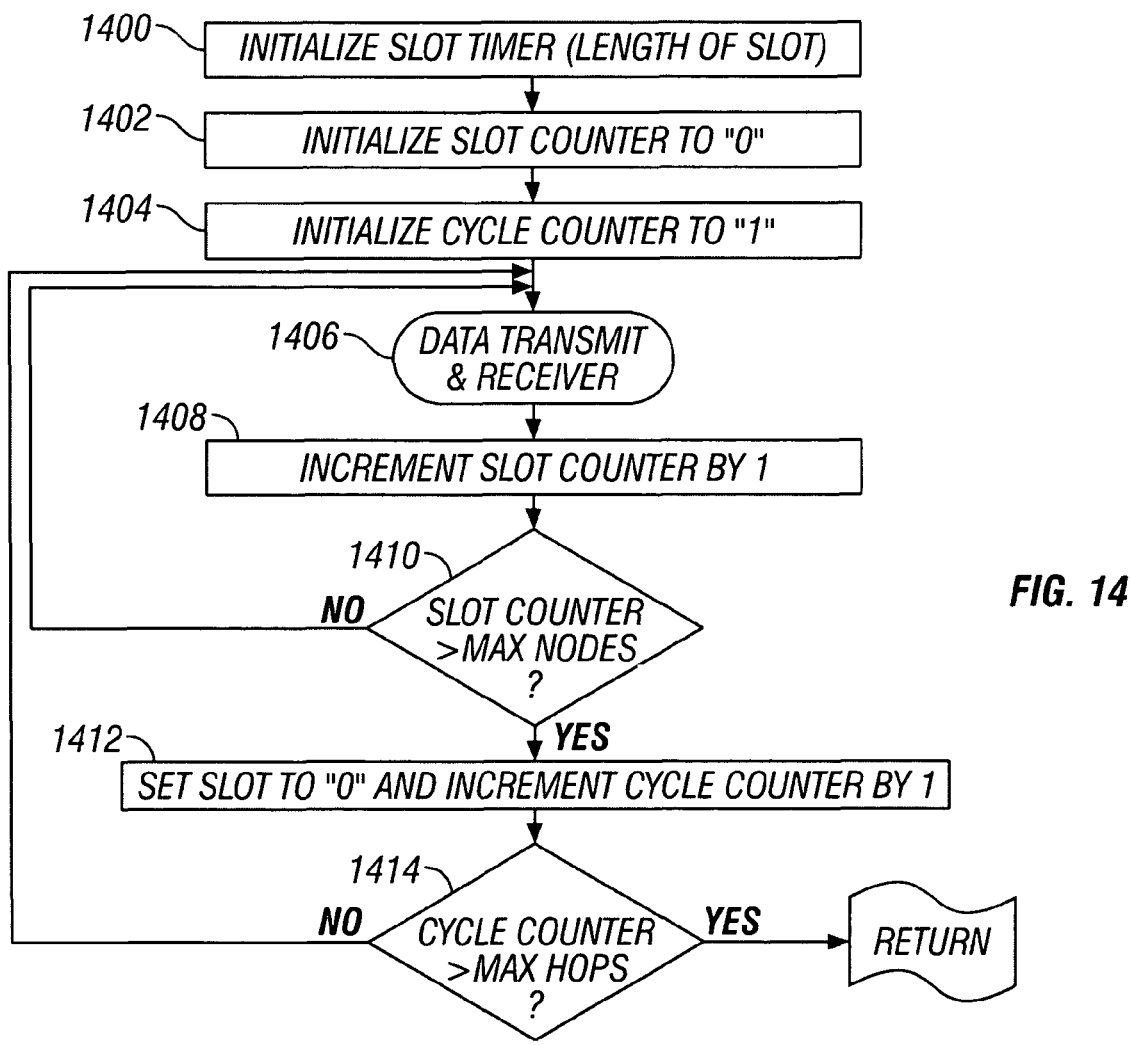
FIGS. 14 and 15 show the flood data sequence.

The flood data sequence may follow the flowchart shown in FIG. 14. As in previous operations, the flood data sequence starts by initializing the slot timer at 1400, initializing the slot counter to zero at 1402, and then initializing the cycle counter to one at 1404. At 1406, data is transmitted and/or received depending on whether the slot is assigned to the pod, or not. Based on the results of the ping phase, the pods may, if desired, listen for data only during time slots where neighboring pods are present. At 1408, the slot counter is incremented, and 1410 determines if the maximum number of slots have been received and/or transmitted. If so, the slot is set to zero and the cycle counter is incremented at 1412. At 1414, the cycle counter is compared to the maximum number of hops. (Again, this number can be greater than the actual number of hops for data to move across the Sensor Web, allowing for future Sensor Web growth.)

Figure 15:
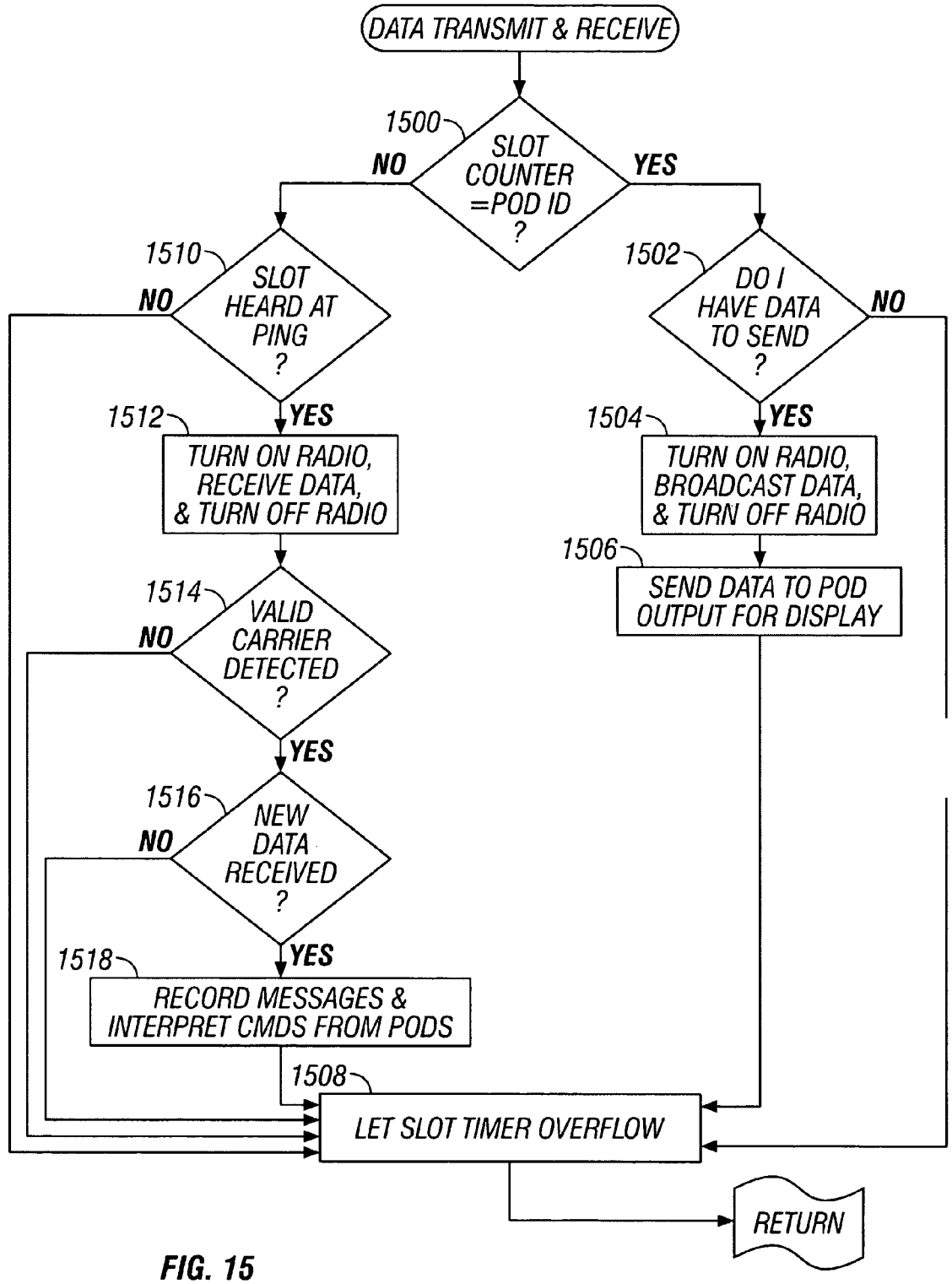

The data transmit and receive at 1406 is shown in further detail in the flowchart of FIG. 15. The data can be any kind of data including raw data, interpreted data, pod diagnostics, as well as commands from other pods. The clock may also be sent as data. In the data transmit and receive, the first operation at 1500 determines if the slot counter equals the pod ID. If so, then this is the slot during which the pod should send. At 1502, the pod determines if it has data to send. If so, it turns on the radio at 1504 broadcasts data, and turns off the radio. If the pod is connected to a portal, at 1506 the data is sent for display. Then the slot timer is allowed to overflow at 1508.

However, if the slot counter is not equal to the pod ID at 1500, the system determines that 1510 whether the specific slot was heard during the ping phase. If not, control passes to the timer overflow. However, if the slot was heard, then the radio is turned on 1512 to determine if the varied valid carrier has been received at 1514. If so, it checks for new data and at 1518 records and interprets commands.

In the worst case, it may be possible for a pod to receive the current messages from all other members of its local clump before its first opportunity to transmit message packets. Therefore, in the worst case a given pod may have to retain temporarily a total of C messages (including its own) and transmit all of them in its first transmission slot. Therefore, in the worst case the length of a flood slot must be sufficient for the transmission of C messages at the Sensor Web pod radio's transmission rate (currently 28.8 kbps). Faster radios with accelerated transmission rates may also be used, and the slot timings would scale accordingly.

Currently, to ensure smooth Sensor Web operation, the two standard maximum clump sizes are 14 pods and 30 pods, and flood slot length is configured to be either 142 msec ("slot 16", a 16 byte message, corresponding to 14 pod clumps) or 284 msec ("slot 32" corresponding to 14 pod clumps of 32 byte messages; or 30 pod clumps of 16 byte messages).

The clump size determines the maximum number of messages that can be passed and relayed by a single pod during a single transmission during the data flood phase. For example, a clump size of 14 pods passing 16 byte messages requires that 224 bytes must be capable of being passed during a single transmission slot. Assuming a burst baud rate of 28.8 kbps, this translates into 2.88 bytes/msec (here a byte is 10 bits to account for error checking). Thus 224 bytes require 77.8 msec to transmit. When time is added to account for additional packet header transmission, radio warm-up, and additional tolerances, a slot-16 time becomes 142 msec. Virtual pods will contribute to the clump size but do not contribute to the Sensor Web size N. Lowering the number of pods in a clump and increasing the number of hops across the Sensor Web allows for larger overall web sizes. Present implementations allow Sensor Web sizes large enough for many practical applications and may well be extended by multiple frequency use or other "web of webs" organizing schemes or faster radios.

Dormant Phase at 570 occurs throughout the balance of the cluster's duty cycle, all pods are silent: all transmitters and receivers are turned off to conserve power. The pods primarily use the low speed oscillator during this phase, although the high speed oscillator can also be used, especially for calculations.

The pods may carry out calculations during the dormant phase. Because the pods are aware of conditions at other pods, non-local analysis of the data is possible. Moreover, this analysis can take place on the fly or during the dormant phase before the next main loop is executed. An example of post-processing of the data include gradient calculation of a sensed quantity (by using the GPS locations of the pod—either generated by an on-board GPS system or coordinates stored in the pod at the time of deployment—and the scalar quantity). This allows for vector information to be discerned within the Sensor Web itself. In addition, this data analysis provides a natural bandwidth compression, for if the operation of the Sensor Web requires the motion of a plume front, only the vector, rather than the scalar information from the entire Sensor Web need be passed around.

In addition, because the Sensor Web pods are aware of conditions across the entire Sensor Web at the same time, it is possible to do on-the-fly comparisons, local averages, global averages, and pod-to-pod correlations of sensed quantities. This allows, for example, a determination of whether or not a false positive has been detected or whether an actuator should really be triggered. As a specific example, a sprinkler for a fire alarm may only be turned on if more than one temperature sensor rises beyond a threshold or if the average temperature of the entire Sensor Web passes above a threshold. This global awareness of the Sensor Web pods with each other also allows for system warnings to take place with reduced latency and not reliant on the full main loop period.

An Interrupt may modify the dormant phase to accommodate a wide variety of additional functions without significant compromise in power consumption. This is achieved by various interrupts that are searched for and recorded during this phase. For example, at a period much smaller than the duty cycle, all pods listen for a special interrupt "beacon" for a very brief time (few milliseconds). If nothing is heard, the pods stay dormant until the next time to look for the beacon again (e.g. every 15 seconds if the main loop duty cycle is 5 minutes). Should a beacon be heard, the pods pass this signal around (by broadcasting the beacon themselves) like new data and the system-wide interrupt will move rapidly through the system.

The interrupt beacon may be initiated via the user through the mother pod as a user-initiated beacon. As an alternative, an interrupt may be created by a condition which occurs during parameter sensing providing for event-triggered sensing. For example, a sensing and/or analysis of parameters which indicates the occurrence of a sporadic phenomenon could cause the interrupt. This event-triggered detection within the Sensor Web can allow for lengthened main loop duty cycles with correspondingly decreased power consumption while still avoiding the latency of reaction time involved in the usual Sensor Web operation.

The event-trigger propagates from the detection point as an information wave throughout the Sensor Web until all pods are participating in the higher alert status. After a pre-programmed time or a different command on the beacon signal, the Sensor Web will be instructed to go back to its primary cycle state. Smart search algorithms are also activated during this phase which conserves power consumption by placing the Sensor Web pod in a state of extended hibernation until it is required to "wake up", or when it detects the presence of an active neighbor pod.

After the dormant phase, the loop repeats.

Figure 17:
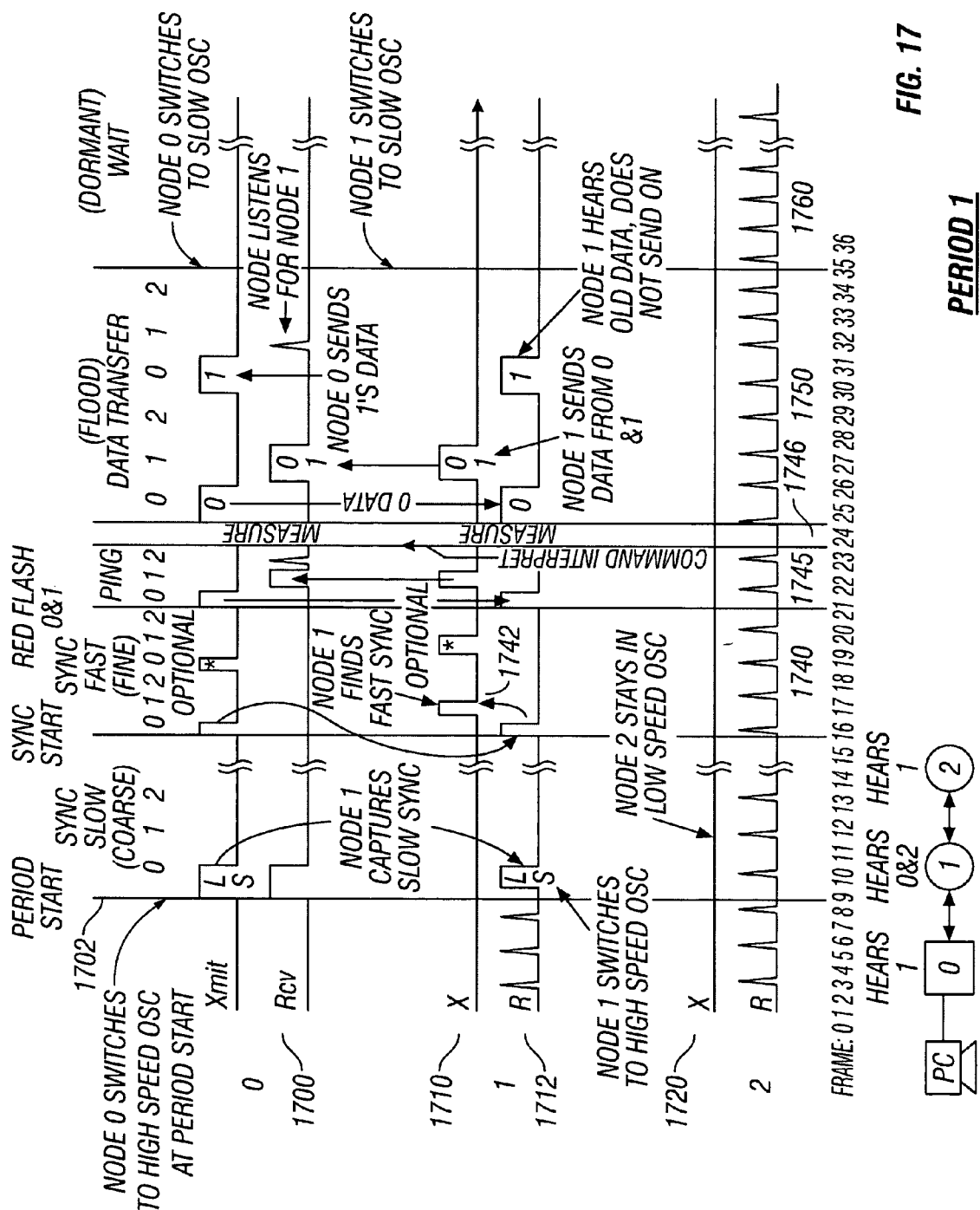

The operation of the overall flow is summarized with reference to the timing diagrams of FIGS. 17 and 18. FIG. 17 shows the timing operations of a system that includes three pods numbered 0,1 and 2. Of course, it should be understood that any number of pods could follow the same operation. Pod 0, shown as line 1700, is the mother pod which includes the master clock. At the start of each period, shown as time period 1702, the coarse synch is sent. At the initial time, the pod number 1, shown as 1710, is not yet synched. The receive line 1712 of pod 1710 is turned on intermittently to listen for the coarse synch. At the time shown as node 1 captures slow sync, the node 1 catches the coarse synch, and then switches to its high speed oscillator.

Note that throughout the first period of operation, shown as FIG. 17, the node number 2, shown as 1720, never captures the coarse synch. The receive pulse is turned on, for short listens throughout the entire period 1.

The fine synch sequence begins at 1740, and the node 1 receives the fine synch at this time, and then echoes the fine synch shown as 1742.

In 1745, each node sends pings during its assigned time slot to its neighbors. Note that node 0 pings during time slot zero, while node one pings during time slot one and receives only the ping during time slot zero. Therefore, the node one knows which slots to listen to based on the ping cycle. 1746 represents the time slot during which all of the pods' sensors simultaneously measure their assigned parameters. Note that since the time bases are synchronized, that the parameter sensing is also synchronized.

1750 represents the data flood sequence. Note that since node one has carried out a ping operation, it knows that it will only receive data during time slot 0. Hence, the receiver is only turned on during this time.

FIG. 18 represents the second period. In this period, the node 2,1720 does in fact receive the coarse synch at 1820, and enters the Web at this time. Since the node 1720 has entered the web, the subsequent ping operation has the result of receiving two values. Therefore, the node one turns on for the two different times, as compared with the previous time in which the node does not.

By following all of these operations, The Sensor Web concepts allows for a reactive, autonomous instrument. The pods can anticipate and respond to spatio-temporal phenomena even before the phenomenon is local to the pod. In summary, the tagged information within the Sensor Web includes
1. raw sensor data taken locally or from other pods
2. interpreted sensor data (either intra- or inter-pod sensor data)
3. commands originating from an end-user
4. commands originating from other Sensor Web pods (as a reaction to a phenomenon)

The Sensor Web concept allows for a field-evolvable instrument. By adding pods in the field that are more capable (i.e. better packaging, improved batteries, more efficient sensors, etc.), the system can be upgraded while still providing the Sensor Web communication backbone, so long as the protocols of the new pods are either the same as or backwards compatible to the older ones.

The Sensor Web concept also allows pods to drop-in and join the web, either permanently or temporarily. In addition to allowing the potential for growing the Sensor Web beyond its initial deployment, it also allows for wireless personal computers or PDA (appropriately configured) to become an access point into the Sensor Web. Thus, an operator might take a PDA into the field to recalibrate specific sensors or run diagnostics in an area of deployment.

The ability of pods to use nonlocal information may be important to the Sensor Web operation. It allows for yet another capability not possible with typical in-situ systems: indirect (or inferred) measurements. For example, by using spatio-temporal trending, it becomes possible to extend the range or sensitivities of the sensors (e.g. see "zone of compliance" in environmental remediation below). Conversely, it is possible to use simple, cheap sensors to measure complex phenomena by having so many in the field (e.g. study botanical transpiration via a temperature/humidity grid rather than making direct carbon dioxide measurements). The pods can also combine scalar information (e.g. concentrations) into vector information (e.g. flows).

The Sensor Web has basically unlimited potential. Just a few of the different application areas and examples may be summarized as:

Security;
Remediation;
Agriculture (e.g. precision agriculture);
Environmental Control The sensor web can further enable and augment other monitoring technologies such as remote measurements (e.g. ground-truthing and in-situ augmentation of measurements not possible remotely) and roving measurements (e.g. providing an intelligent static membrane over a large area). Examples of the latter kind include moving an instrument-laden rover to where a phenomenon is occurring and guiding a tractor to squirt fertilizer in precise measurements at precise spots. A related example includes swiveling a turret (camera, gun, etc.) in the direction of a moving phenomena to target it.

Specific applications include:
a) Homeland Defense
decontamination operations in buildings: the ability to monitor the decontamination agent in buildings to ensure proper conditions and concentration over the soak time (example: holding the temperature/humidity/concentration of chlorine dioxide constant for several days during anthrax decontamination)
perimeter control: the ability to use acoustic and seismographic sensors to triangulate on intruder direction. This could trigger a camera on a swivel mount to point in the direction of the intruder for further information on identification. On a pipeline, this system could be combined with that looking for leaks in the pipe (see below under environmental protection).

reactive/evacuation systems: detection of gaseous toxins (i.e. serin gas, mustard gas, etc.) in a system identifies plume movement indicating egress routes. In a subway system, this could identify poisonous gas clouds, determine direction, and activate blowers to contain the gas clouds away from the platforms with people.

fire locator: use particulate detector to identify smoke, shared information allows for automated queries about false positives, once smoke is confirmed, the system identifies differing densities of smoke allowing for the locus of the fire to be identifies. This also allows for egress routes to be identified automatically.

zone protection: the shared information of the pods allows different simple sensors to combine knowledge to sophisticated results as the targeted phenomena moves towards the protected site, biomimetric sensing. An example would be to detect chlorine gas via cheap humidity sensors which detect the local drop in water vapor as a result of the chemical reaction when chlorine is released. Another example is to detect an anthrax spore cloud: on the outer zone use cheap particle scattering sensors (anemometers) to determine if some particulate is in the air, the next inner zone, use more sophisticated sensors to determine particle size (like a sieve), if the particles are smaller than 5 microns, this could be anthrax spores, so in the innermost zone, activate the nematode biotoxin sensors (which have a limited life due to the food available for the nematodes). This is another example of how the Sensor Web autonomously controls it's own internal resources (including that of the sensors).

shipping dock handling control: the single-unit nature of a Sensor Web can be exploited as a means of maintaining the integrity of a collection of containers on a shipping palette. An alarm would sound if a container becomes missing from its bundle. As a result, the Sensor Web acts as a wireless net, surrounding and penetrating a collection of containers.

first-responder breadcrumbs: a Sensor Web becomes an active trail within a collapsed or contaminated building and can be deployed by first-responders or search robots. This allows for a communications link between rescue workers and coordinating officials outside. The Sensor Web also provides an infrastructure allowing for detection of placement and movement of pingers placed on first responders (see "inventory control" under Miscellaneous below) as well any vital signs on first responders (in case of a downed rescuer). It would allow each person inside the building to keep track of other rescuer movements and position. It would allow each person inside the building to monitor for conditions in rooms previously passed through for additional leaks, strains on shored-up ceilings and walls, or other changing conditions that would present additional dangers or prevent egress along the entry path. Sensor Web pod equipped with voice chips and speakers could be activated to guide rescue dogs via prerecorded voice commands as handlers outside the area watch dog movements and positions (via pingers on the dogs' collars).

b) Horticulture and Agriculture transgenic crops (indoor and outdoor): Requires precise environmental monitoring (air temp, soil temp, humidity, light, etc.) for research and for growth and cultivation greenhouse managed crops: The Sensor Web would act in not only monitoring but actively controlling the greenhouse. Pods would analyze non-local data and switch actuators controlling such variables as light (via blinds), humidity (via misters) and irrigation. The active environmental control would replace current bang-bang controls allowing for a more steady environment and better resource management. Again the analysis would fuse non-local data to build a more complex picture of the environment.

irrigation/fertilization control: outdoor crops can be similarly managed, providing better treatment of the soil (by not overwatering or overfertilizing) and a more consistent environment for the crops. Nitrates could be monitored for fertilization and autonomous vehicles would use this data from the Sensor Web to determine where to squirt the nutrients.

pest control: Typical present reaction to pests/blights is to carpet-bomb the infected and surrounding areas. Similar to perimeter control, the Sensor Web can encircle an area and through the use of acoustic signatures or pheromone sensors determine the presence of a pest, leading to precision removal. This is better for the environment and conserves on pest control poisons.

heat transfer/respiration measurements for irrigation: although carbon dioxide sensors are not available, by using the differing temperatures and humidity at different heights (ground/1 m/2 m), it is possible to infer the plant respiration and therefore metabolism of the crop. This is an example of fusing simply measurements to infer a larger picture. Similar techniques can be applied to heat waves in the ground and how that affects tuber and root growth.

correlating/extending remote measurements: for high-yield crops (grapes for wine, fruits, etc.) a continual presence extends the data available from satellite to the subterranean domain (water levels, moisture, soil pH, etc.) and also allows for ground-truthing of vegetation indices.

precision agriculture: currently, precision agriculture is that presently it is too labor intensive to be practical. Moreover, the local environment is disrupted by the insertion of the sensor. With the continual presence of the Sensor Web, large-scale areas can be monitored in a permanent fashion, including the ability to do trending analysis and microclimate model building.

c) Environmental Remediation and Protection toxic plume tracking in water and soil: a continuous presence in subterranean and estuarial monitoring for Superfund and known toxic sites. Toxins such as Tri-chloraethylene (TCE), benzene, MBTE, etc. can be tracked by putting Sensor Web monitoring stations in and around well-sites or directly into the soil. The Sensor Web would allow for (a) toxin monitoring and (b) alarms if toxin go beyond pre-assigned concentrations. Present Superfund sites require quarterly well-monitoring trips and the lab analysis can vary widely. The Sensor Web would provide consistent measurements, continual measurements, alarm potential, thereby significantly reducing costs.

zone of compliance: by using a grid of densely distributed measurement point, the Sensor Web is able to detect real-time spatio-temporal trends. This allows for gradients to be measured and tracked (rather than concentrations) and consequently extend the range of the implied sensor measurement sensitivity.

nuclear waste site monitoring: Sensor Webs outfitted with Geiger counters can be placed around nuclear waste containers and throughout nuclear waste sites (e.g. Yucca Mountain) and provide warning of leakage and direction of leaks, possibly activating automated decontamination chemicals to slow spread before full human response and intervention.

sewage treatment monitoring: Sensor Webs can monitor water quality throughout the plant, autonomously determining flow control effluent tracking: Sensor Webs can monitor rainwater from urban areas all the way to coastal outflows and bay areas. They can be used by local municipalities to determine the reclamation around construction sites. They can insure proper water quality from reservoirs and aquifers. They can ensure EPA standards are maintains in estuarial areas and identify factories where the contaminants originate. This can also be coupled into remote measurements of the near ocean environments and the large bay areas.

pipeline leak monitoring: Sensor Webs can be deployed along lengths of pipeline containing oil, natural gas, etc. to monitor for leaks. Sensors detecting hydrocarbon vapors that occur around a spillage, or natural gas (and any of its aromatic additives) would allow for rapid detection and location of a pipe leak. Similar scenarios occur for the electrical conduit, oil-filled pipes used to transmit electric power from plants to local stations (particularly in urban areas like New York City where it is not possible dig up quantities of pavement to find the leak).

conservation land management: monitoring growth in decimated regions (fire, flood, etc.), can be used in rain forest regions to understand reclamation after slash and burn techniques, also the logging industry to monitor forests animal population tracking: monitor animal behavior and habitat (similar to "inventory control" below in miscellaneous.

d) Water Resource Management precision irrigation: monitoring the water table and soil moisture will allow proper control of sprinkler systems, away from bang-bang control. Trending will develop known areas of pooling and condensation allowing for more precise sprinkler patterns. This will also significantly conserve resources, particularly in dry areas where golf courses are located and the central valley region of California where many crops are grown.

water table analysis: geohydrodynamics would be easily studied, particularly in areas where underground flows are important. Effects of rainfall would immediately be apparent. This application would easily be combined with effluent tracking and the water level sensors would be placed in the well along with the toxin sensors.

water grid: potable water and reclaimed water can be tracked at mixing stations and demands estimated based on non-local soil moistures leading to a full-scale "water grid" linking production and demand on a site by site basis (much like the electric power grid). Such a system would have "brown out" conditions when anticipated demand for lawn sprinklers exceeds available supply. This will prevent over-watering and slow down erosion and nutrient movement.

water quality: track the mixing of potable/non-potable sources, dissolved salts, etc. in and around water pumping stations to both monitor and maintain quality of downstream water.

e) Air Resource Management building air quality monitoring: see human habitat below toxic air containment: Sensor Webs can actuate doors to seal sections of buildings off as plumes are tracked (i.e. chlorine gas, hydrogen sulfide, etc.) Conversely, the Sensor Web system can track oxygen levels and determine breathable areas, showing routes to get to them.

local tracking of pollutants: emission maps in cities, around factories global tracking of pollutants: in concert with large-scale satellite measurements, the in situ Sensor Web can detect pollutants before dispersal makes them impossible to track using the remote measurements f) Miscellaneous human habitat monitoring and control: similar to greenhouse monitoring—link the Sensor Web into the environmental controls. This will converse power as heat, air conditioning, humidifier, etc. would only active in local regions where occupants are. Could be integrated into with a security system/fire locator system.

vehicle monitoring: the Sensor Web will provide car, trucks, ships, with an dynamic electronic skin allowing for anticipation of failure of parts, new external conditions, etc.

civil engineering structures: monitor bridge vibrations (acoustics and strain gauges), girder by girder, to anticipate failure. Monitor emergency strut structures erected by first responders inside a collapsed building for to warn for additional building settling and movement. Monitor ground quality (temperature, moisture, etc.) for long term static loads like pipe-lines. Large structures that need to be manipulated mechanically to be tuned (e.g. radio telescope dishes) can be automated to be sensitive to local weather changes and can react automatically to maintain bearing, etc.

ground-truth of satellite data: Instruments on satellites need periodic checking and calibration. The Sensor Web is the only way of calibrating over a large area (like a satellite would view) against a known in situ standard.

ground-sky tracking system: satellites and airborne autonomous vehicles only pass over an area for a limited time. Real time, autonomous reaction is possible by coupling a Sensor Web with satellites. The Sensor Web would then tell where to point the satellites, particularly in environmentally dynamic areas (e.g. fires, floods, etc.)

mobile tracking system: similarly, a mobile platform can be commanded by a static Sensor Web to move to areas of interest at specific times (the detectors on the mobile platform are more expensive or more delicate than those on the pods and cannot be placed everywhere). This ensures placing the right detectors out at the right time to catch the key phenomena. In addition, it reduces latency by automating a large-scale decision process.

earthquake/volcano eruption warning: gaseous ground emissions are often precursors of geological activity. The virtual presence of the Sensor Web can detect and track hydrogen sulfide plumes, etc. leading to geological predictors and early warning systems.

inventory control: RF tags can be used as pingers can be used as a source that the Sensor Web will pick up, thereby providing a continual tracking of an item in a store or warehouse. This can be used for both inventory control and security/theft monitoring. A similar technique for monitoring animals (including endangered species) and their habitats or for first responders in a collapsed building can be used by placing the pinger on the animal or human.

Although only a few embodiments have been disclosed in detail above, other modifications are possible.

What is claimed is:

1. A method, comprising:

deploying a plurality of sensor pods to a plurality of separated locations, and wherein each of said sensor pods have an internal time base, to measure a specified parameter;

synchronizing said time bases among said plurality of sensor pods by wirelessly transmitting a synchronization pattern that includes a data sync header, followed by actual real time clock information from a master clock, wherein said synchronizing comprises synchronizing to said synchronization pattern in order to sync each said sensor pod coarsely to the real time clock information from the master clock, and subsequently carrying out a second, fine synchronization, and where said fine synchronization provides the actual real time clock information;

using the synchronized time bases in each of said plurality of sensor pods to measure said specified parameter in each of said plurality of separate location sensor pods, at a synchronized first time in each of said sensor pods, and to report said specified parameter, where there are first and second sensor pods, and neither of said first and second sensor pods report said specified parameter at non-synchronized times; and communicating between said sensor pods by communicating from a first sensor pod to a second sensor pod, and from said second sensor pod to a third sensor pod.

2. A method as in claim 1, wherein said synchronized time is precisely the same moment in each of said sensor pods.

3. A method as in claim 1, further comprising using said synchronized time base to carry out a main processing loop in each of said plurality of sensor pods which both starts and ends at substantially the same time.

4. A method as in claim 1, wherein said first and second sensor pods are each assigned a time slot within a time base, and each communicate with other sensor pods during said time slot within said time base.

5. A method as in claim 1, each of said spaced sensor pods transmit each item of information only a single time to another sensor pod.

6. A method as in claim 5, wherein each of said sensor pods has an identifier, and each of said sensor pods communicates during a parameter sensing routine at a specified time slot.

7. A method as in claim 5, further comprising a ping routine, during which each of the sensor pods determine which other sensor pods exist, and time slots during the existing sensors communicate, and listening only during times of the existing sensors and causing said sensor pods to enter a power reduced state at power reduced times between said first time and a second time, such that each of said first and second sensor pods maintain a power reduced state at said power reduced times, and each of said first and second sensor pods receive data at said first time.

8. A method as in claim 1, further comprising sharing data between the plurality of sensor pods, such that each of the sensor pods receives data from each other sensor pod.

9. A method as in claim 8, further comprising processing the data from the plurality of sensor pods, to determine information from the data and processing the data from each of the plurality of sensor pods, to determine information indicative of the first parameter that was measured by multiple different sensor pods.

10. A method as in claim 9, wherein the information from the data is vector information including both scalar and direction information related to a value of parameters sensed at different locations.

11. A method as in claim 1, further comprising adding another sensor pod to the sensor web during operation of the sensor web.

12. A method as in claim 11, wherein said another sensor pod is a sensor pod with a different hardware configuration then at least one other sensor pod in the web.

13. A method as in claim 11, further comprising, after adding said another sensor pod, resynchronizing a clock within said another sensor pod with said synchronized time base.

14. A method, comprising:

first, coarsely synchronizing a sensor pod to a master clock, using a coarse synchronization operation which looks for a wirelessly transmitted synchronization pattern that includes actual data real time clock information, where said synchronization pattern includes a data synchronization header, followed by the actual real time clock information from the master clock, and wherein said coarse synchronization information synchronizes to said synchronization pattern in order to sync the sensor pod coarsely to the actual real time clock information to provide the same real time clock information as in said master clock;

second, after said coarsely synchronizing, finely synchronizing said sensor pod to said master clock using a fine synchronization operation, where said fine synchronization takes more power then said coarse synchronization, and where said fine synchronization provides further synchronization to said actual real time clock information than said coarse synchronization.

* * * * *